(12) United States Patent
Estill et al.

(10) Patent No.: US 11,412,877 B2
(45) Date of Patent: Aug. 16, 2022

(54) SYSTEM FOR PARCEL TRANSPORT AND TRACKING OPERATED RESPONSIVE TO DATA BEARING RECORDS

(71) Applicant: ShipperBee, Inc., Guelph (CA)

(72) Inventors: Jim Estill, Guelph (CA); Gregory Allan Thomas Hall, Guelph (CA); Chris Wilson, Port Perry (CA); Stephen Abellera, Toronto (CA)

(73) Assignee: Danby Products Limited, Guelph (CA)

( * ) Notice: Subject to any disclaimer, the term of this patent is extended or adjusted under 35 U.S.C. 154(b) by 37 days.

(21) Appl. No.: 17/146,830

(22) Filed: Jan. 12, 2021

(65) Prior Publication Data

US 2021/0127882 A1 May 6, 2021

Related U.S. Application Data

(63) Continuation-in-part of application No. 16/987,841, filed on Aug. 7, 2020, now Pat. No. 11,080,646, which is a continuation-in-part of application No. 16/724,595, filed on Dec. 23, 2019, now Pat. No. 10,783,487, which is a continuation-in-part of application No. 16/253,461, filed on Jan. 22, 2019, now Pat. No. 10,740,992, said application No. 16/724,595 is a continuation-in-part of application No. PCT/IB2019/050644, filed on Jan. 26, 2019.

(60) Provisional application No. 62/965,398, filed on Jan. 24, 2020, provisional application No. 62/961,885, filed on Jan. 16, 2020, provisional application No. 62/784,967, filed on Dec. 26, 2018, provisional application No. 62/677,383, filed on May 29, 2018, provisional application No. 62/622,193, filed on Jan. 26, 2018.

(51) Int. Cl.
*G06Q 10/08* (2012.01)
*A47G 29/20* (2006.01)
*G07C 9/00* (2020.01)

(52) U.S. Cl.
CPC ......... *A47G 29/20* (2013.01); *G06Q 10/0832* (2013.01); *G07C 9/00309* (2013.01)

(58) Field of Classification Search
CPC .............. A47G 29/20; A47G 2029/145; A47G 2029/149; A47G 29/141; A47G 2200/226; G06Q 10/0832; G06Q 10/0836; G07C 9/00309; G07C 9/00896; G07C 9/00912
See application file for complete search history.

(56) References Cited

U.S. PATENT DOCUMENTS 11,080,646 B2 * 8/2021 Estill .................... G06K 7/1413

* cited by examiner

*Primary Examiner* — Seung H Lee
(74) *Attorney, Agent, or Firm* — Ralph E. Jocke; Walker & Jocke

(57) ABSTRACT

The system for parcel transport and tracking that operates responsive to data bearing records includes a plurality of geographically spaced repositories. The exemplary repositories each include an interior area comprised of a plurality of enclosed compartment spaces. Access to each of the enclosed compartment spaces is controlled by a respective door which is in operative connection with a respective lock. Repositories are constructed to provide a secure enclosure for the parcels housed therein when exposed to a range of environmental and operating conditions. Central control circuitry in operative connection with the repositories is operative to control access to the compartment spaces and cause the compartments to be selectively accessible so that selected parcels may be placed therein or removed therefrom.

24 Claims, 29 Drawing Sheets

SYSTEM FOR PARCEL TRANSPORT AND TRACKING OPERATED RESPONSIVE TO DATA BEARING RECORDS

TECHNICAL FIELD

Exemplary arrangements relate to a depository apparatus and system that operates to control and record the receipt and removal of deposit items in response to data bearing records. Exemplary arrangements relate to devices and systems that facilitate the pickup and delivery of items.

BACKGROUND

Depositories that operate to accept deposit items from users have been implemented in a number of different business environments. Commonly depositories are implemented for receiving items that are to be provided to an owner of the depository. For example depositories have been implemented to receive financial deposits, utility bill payments or other items of value that are to be provided only to the bank, utility company or other entity that operates the depository. Generally the depositories are implemented so that once an item has been deposited therein by the user, only an authorized representative of the depository operator is enabled to access the deposited items and remove them from the depository for further processing.

Various endeavors have been made to improve depositories and the processes associated with the receipt and removal of deposit items. However, depositories and depository systems may benefit from improvements.

SUMMARY

The exemplary arrangements described herein relate to depositories and associated systems that operate to accept and make available deposit items such as parcels, to authorized users responsive at least in part to data read from data bearing records. Each exemplary depository which is alternatively referred to herein as a repository, includes a body that bounds at least one interior area which is configured to hold deposit item such as parcels. The exemplary interior area includes one or more compartments each of which is accessible from outside the body of the repository through a respective opening. Access through the opening to each compartment interior area is controlled by a respective door that is mounted in connection with the body of the repository and is movable between open and closed positions. An electronic lock is associated with each door. The lock is selectively changeable between a locked condition and an unlocked condition. In the locked condition, the lock is operative to hold the door in the closed position preventing access to the compartment.

The exemplary repository is in operative connection with at least one input device. In exemplary arrangements the at least one input device may include numerous different types of input devices including a wireless communication device. The at least one input device includes or is in operative connection with a reading device. The reading device is configured to read indicia on items such as parcels that are positionable within the interior area. In the exemplary arrangement the at least one input device is also usable to provide data which enables authorized users to access the interior area of the repository.

In the exemplary arrangement the repository is in operative connection with control circuitry. The control circuitry is in operative connection with the at least one input device and each of the locks. Responsive to receipt of user identifying information through the at least one input device, the control circuitry is operative to cause an access determination to be made that the received user identifying information corresponds to stored data associated with an authorized user that is authorized access the interior area of the repository. Responsive at least in part to the determination that the data bearing record data corresponds to an authorized user, a lock associated with at least one compartment is enabled to be changed from the locked condition to the unlocked condition such that the authorized user can open the appropriate door and access the compartment interior area.

The exemplary control circuitry is further operative to receive from at least one reading device, item indicia associated with a deposit item that is either being placed in or removed from the interior area. As used herein a deposit item is alternatively referred to as a parcel and the item indicia is alternatively referred to as parcel indicia. The exemplary control circuitry is further operative responsive at least in part to the at least one reading device to cause a determination of an action status indicative of whether the parcel is to be removed from or placed into the interior area. The parcel determination is made responsive to operation of the control circuitry concerning whether the parcel indicia that is associated with the parcel corresponds to stored data associated with a parcel to be placed into or removed from the interior area of the repository by the authorized user.

Once the parcel has been placed in or removed from the interior area of the repository, the door is closed and the control circuitry is operative to return the lock to the locked condition. A central system in operative connection with the exemplary control circuitry is operative to track the status of the parcel. This may include for example, tracking transport of the parcel to another repository in which the parcel can be deposited by the authorized user who removed the parcel from the first repository, so that the parcel may then undergo further processing activity. Alternatively the system may enable a further authorized user to access and remove a parcel that has been previously placed in the repository, and track receipt of the parcel by another authorized user that is the authorized recipient of the item. Exemplary repositories may include one or plurality of interior areas and compartments, access to each of which is controlled by a respective door, a respective lock and operation of the control circuitry.

In exemplary arrangements the control circuitry associated with the repository enables determining the available space in the interior area and/or in each compartment. This enables evaluating whether the repository or compartment has space available to accept a further parcel prior to a user who is seeking to deposit a parcel being directed to the repository. Other exemplary arrangements include one or more indicators which operate responsive to the control circuitry to provide indications to users that have placed or removed proper parcels from the interior area. Other exemplary arrangements include the ability for the repository to provide audit information that includes identifying indicia associated with parcels currently positioned in the interior area, as well as data regarding parcels previously placed in or removed from the repository. Exemplary arrangements may also capture and store images of users and parcels to further provide records of activities conducted at the repository. Further exemplary arrangements may provide information to item carriers that transport parcels between repositories and that pick up and deliver parcels at customer locations.

Numerous other features and relationships may be used in exemplary systems to provide reliable, cost-effective parcel pickup, delivery and tracking capabilities.

DETAILED DESCRIPTION

Figure 1:
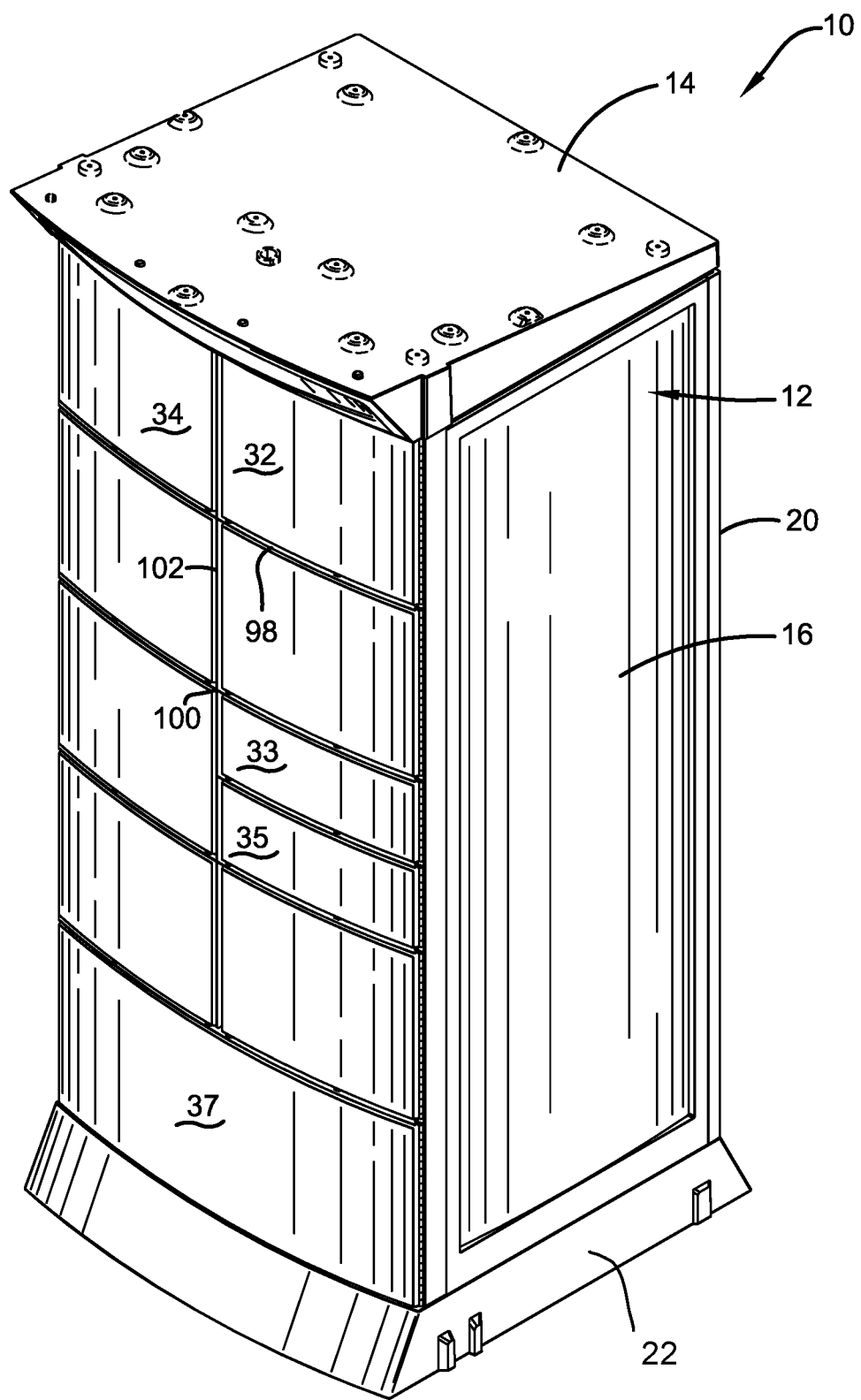
FIG. 1 is a perspective view of an exemplary repository that may be used in a system for parcel transport and tracking in an exemplary arrangement.

Referring now to the drawings and particularly to FIG. 1 there is shown therein an exemplary repository 10. The exemplary repository may be included in a system like that those described in one or more of US Patent Publications 2020-0364657, 2020-0364658, and 2020-0334936, and U.S. Pat. Nos. 10,783,487 and 10,740,992 the disclosures of each of which are incorporated herein by reference in their entirety.

Figure 2:
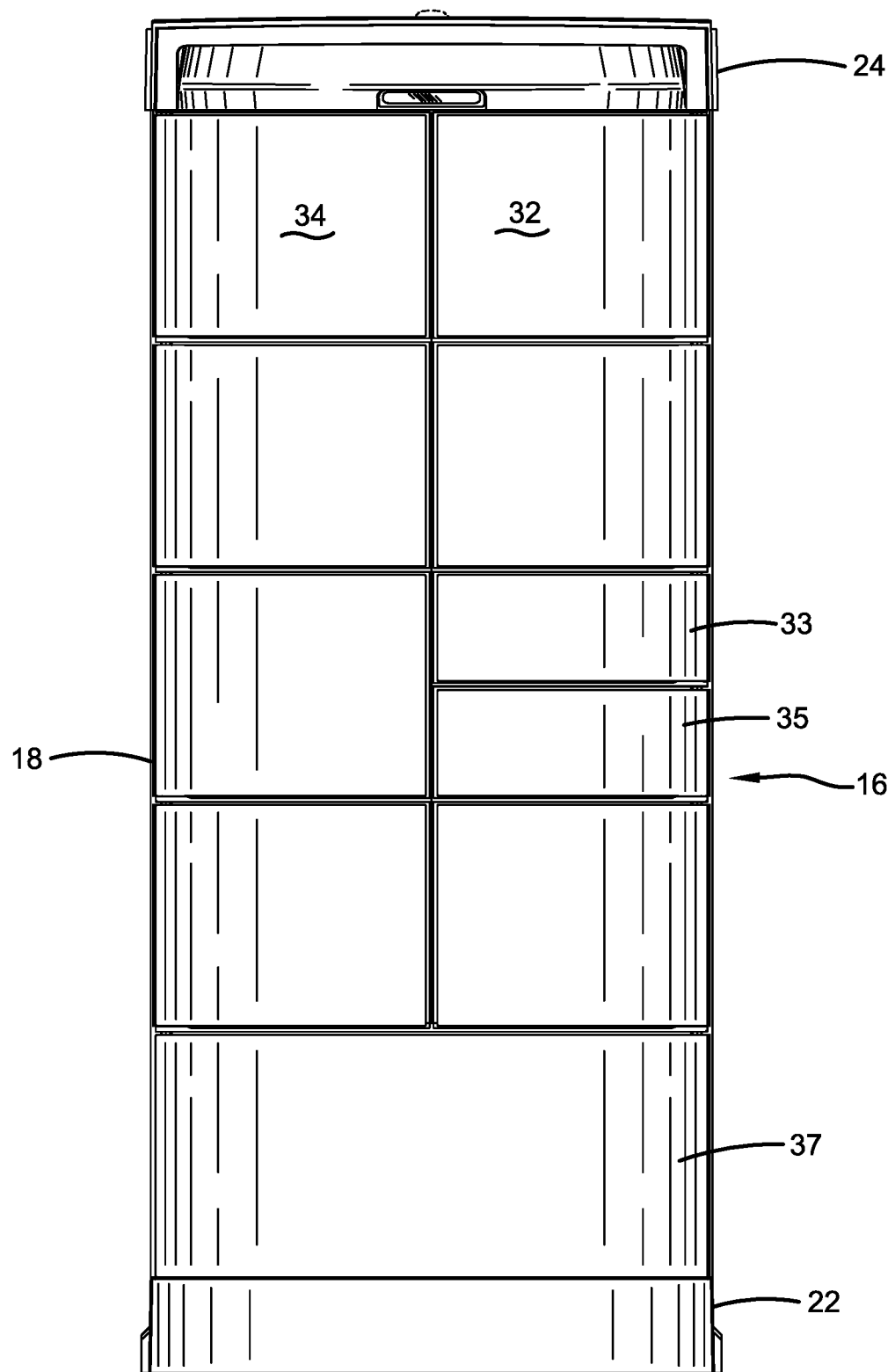
FIG. 2 is a front view of the repository.
Figure 3:
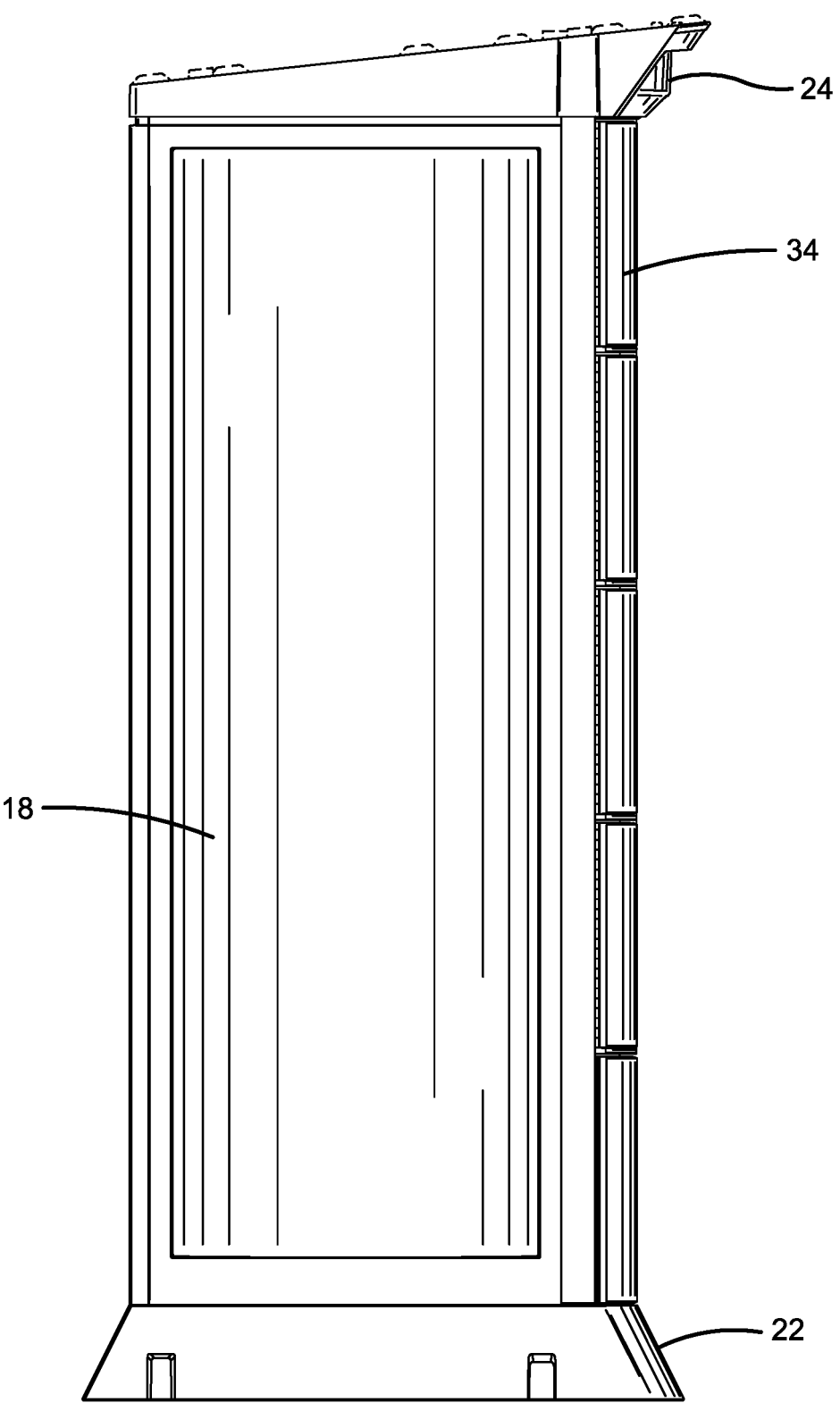
FIG. 3 is a left side view of the repository.

The exemplary repository 10 includes a body 12. The body 12 bounds at least one interior area 14. In the exemplary arrangement the body of the repository includes a right side exterior wall 16 and a left side exterior wall 18 when the repository is viewed from the front as shown in FIG. 2. The exemplary repository further includes a back wall 20 which further bounds the at least one interior area. The exemplary repository further includes a bottom portion 22 and a top portion 24. Of course it should be understood that these components which make up the body of the repository are exemplary, and in other arrangements other types and configurations of components may be used.

Figure 4:
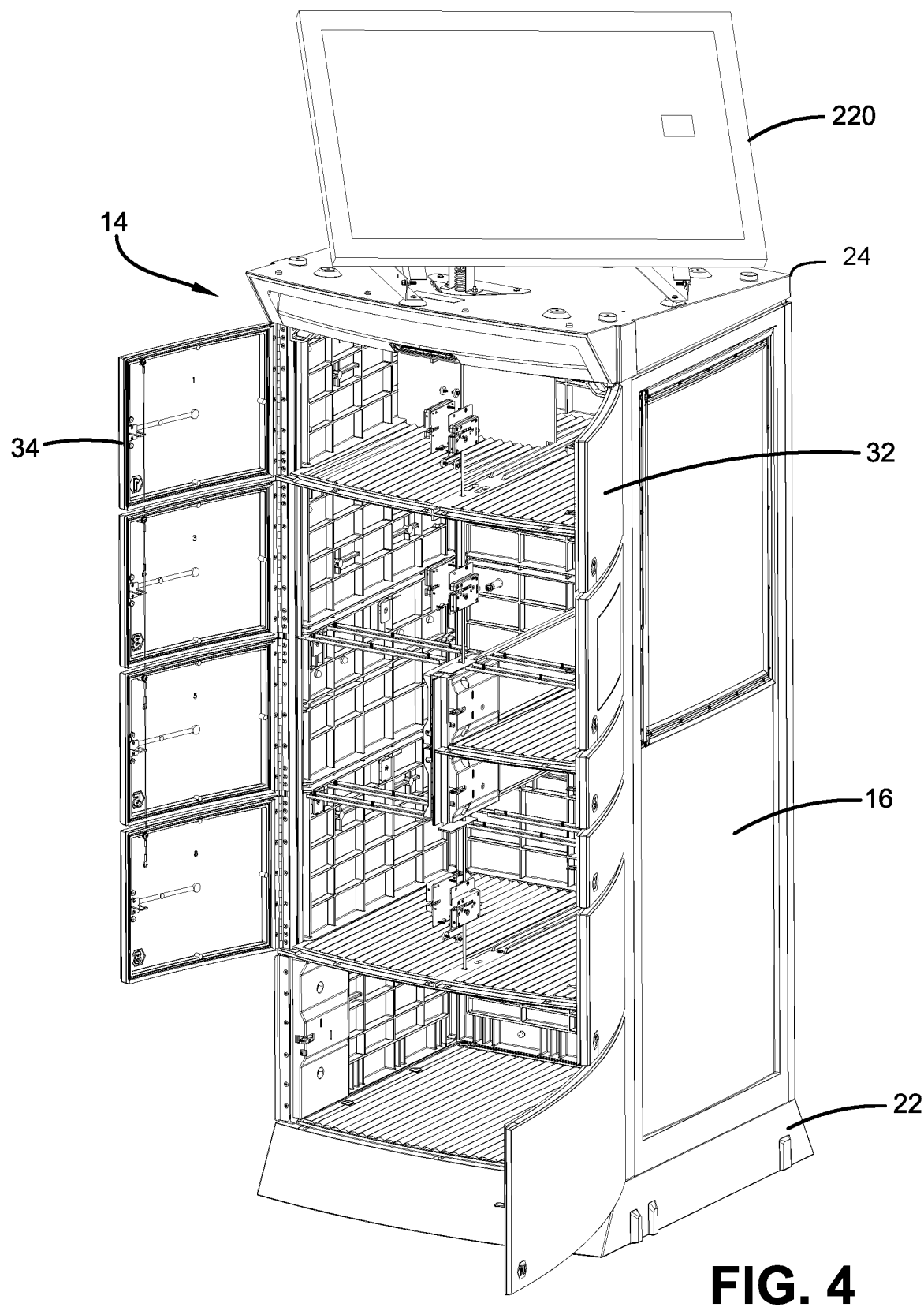
FIG. 4 is a perspective view of the exemplary repository with the compartment doors open and including a solar panel mounted to the top thereof
Figure 5:
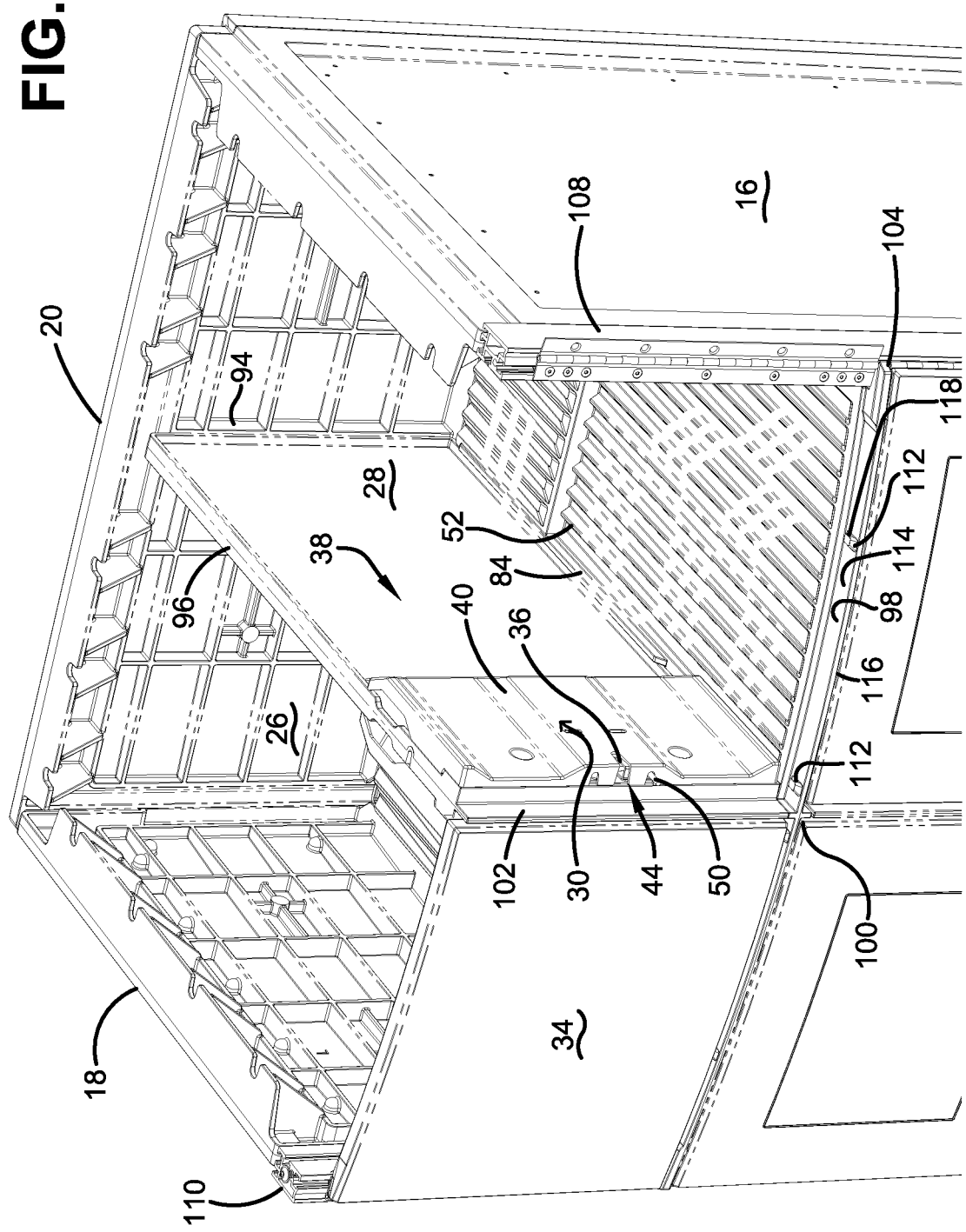
FIG. 5 is a perspective view of the exemplary repository interior with the top and a door removed to show interior components.

In the exemplary arrangement the interior area 14 of the body 12 includes a plurality of separated compartments, for example compartments 26 and 28 shown in FIGS. 4 and 5. Each compartment includes a respective opening, such as opening 30 of compartment 28. The respective opening to a compartment enables access to the compartment interior area from outside the body. In the exemplary arrangement a respective door controls access through the associated opening to the respective compartment interior area. For example a door 32 controls access to compartment 28. A door 34 controls access to compartment 26. In the exemplary arrangement of repository 10, there are 10 doors that control access to 10 compartment interior areas within the repository. Of course this configuration is exemplary and in other arrangements a repository may only have a single interior area compartment or plurality of compartments.

In the exemplary arrangement each door is movably mounted in operative connection with the body in a manner like that later discussed. Each respective door is rotationally movable about an axis and also movable along the axis. In the exemplary arrangement each door is movable while remaining in attached connection with the body, between a closed position in which the door closes its respective opening and compartment interior area, and an open position in which at least a portion of the door is disposed away from its respective opening, and its respective compartment interior area is accessible from outside of the body. FIG. 1 shows all the doors of the exemplary repository 10 in the closed position, while FIG. 4 shows all the doors in an open position. Of course it should be understood that generally during operation of the repository only one door will be opened by an authorized user at a time as discussed in the incorporated disclosures.

In the exemplary repository arrangement, each door is associated with a respective lock. For example a lock 36 is associated with door 32 in the exemplary arrangement. Lock 36 in the exemplary arrangement is in operative attached connection with a vertically extending divider 38 which separates the interior area of compartment 26 from the interior area of compartment 28. In the exemplary arrangement the lock 36 is partially enclosed by a lock cover 40 that is in operatively attached connection with divider 38.

Figure 19:
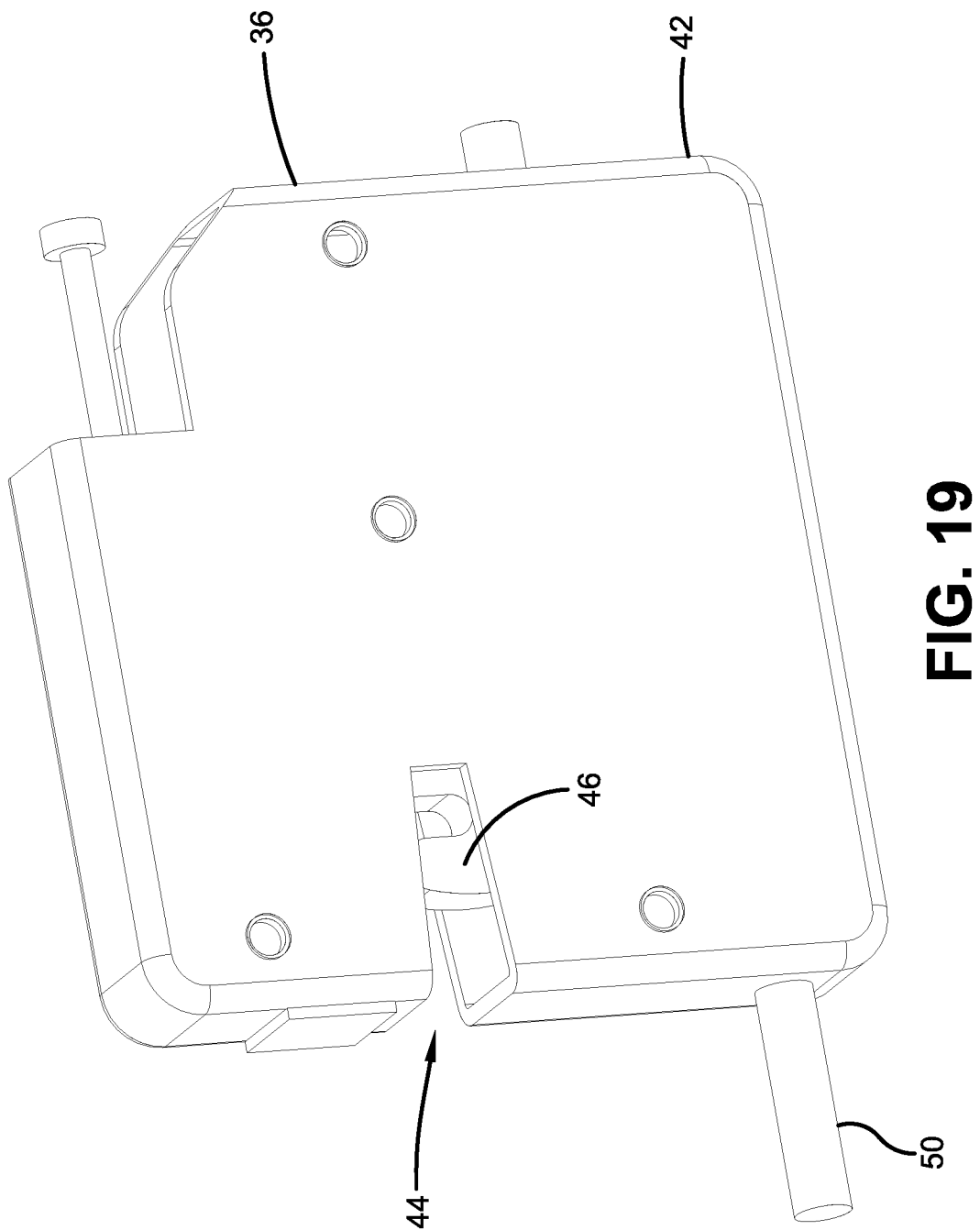
FIG. 19 is a perspective view of an exemplary electronic lock that is used in the exemplary repository.
Figure 20:
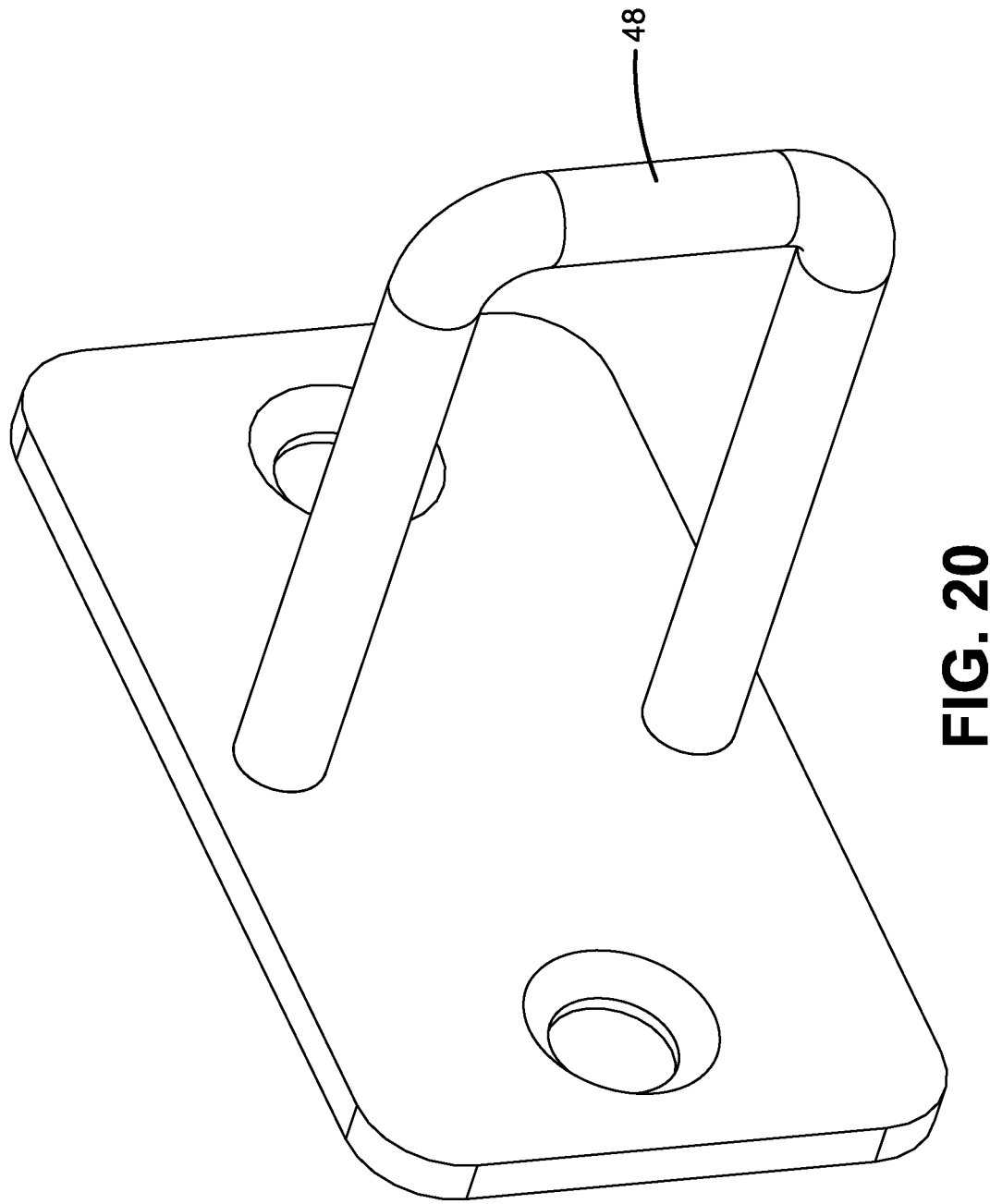
FIG. 20 is a perspective view of an exemplary bolt that is releasably engageable with the electronic locks of the exemplary repository.

The exemplary electronic lock 36 of the exemplary arrangement is shown in greater detail in FIG. 19. The exemplary lock 36 includes a lock body 42 that in the operative position is mostly concealed by the lock cover 40. The lock body 42 includes a bolt accepting slot 44. A jaw 46 is movably mounted inside the lock. The jaw 46 is configured to releasably engage a U-shaped bolt 48 like that shown in FIG. 20. In the exemplary arrangement each door has a bolt in operatively attached connection with an interior face thereof which is engageable with the jaw of the respective lock. In the exemplary arrangement in the closed position of the door, for example door 32, the associated bolt 48 extends from the inside face of the door and in the bolt accepting slot 44. The bolt 48 engages the jaw 46 and moves the jaw such that the jaw holds the bolt in engagement therewith for as long as the lock remains in the locked condition. Responsive to electrical signals from the control circuitry associated with the repository, the lock is enabled to be in the unlocked condition. In the unlocked condition the lock is operative to enable the jaw 46 to be moved so as to disengage the bolt 48. This enables the door 32 to be moved from the closed position to the open position. Of course it should be understood that this locking arrangement is exemplary and other arrangements other approaches may be used.

In the exemplary arrangement the lock 36 includes a forward extending actuator which is alternatively referred to as a plunger 50. The exemplary plunger 50 is movably mounted on the lock body 42 and is biased outwardly by a spring or other suitable biasing member. The exemplary plunger is in operative connection with an electrical switch that is inside the lock body. The exemplary plunger 50 is configured so that when the associated door, such as door 32, is in the closed position, the plunger 50 is disposed inwardly and the associate electrical switch is in an electrical condition which is indicative to the associated circuitry of the repository that the door is closed. When the door 32 is in the open position the plunger is disposed further outwardly in the opening and the associated electrical switch has an electrical condition which is indicative to the circuitry that the door is in the open position. Of course it should be understood that this approach is exemplary and in other arrangements other approaches may be used.

Figure 13:
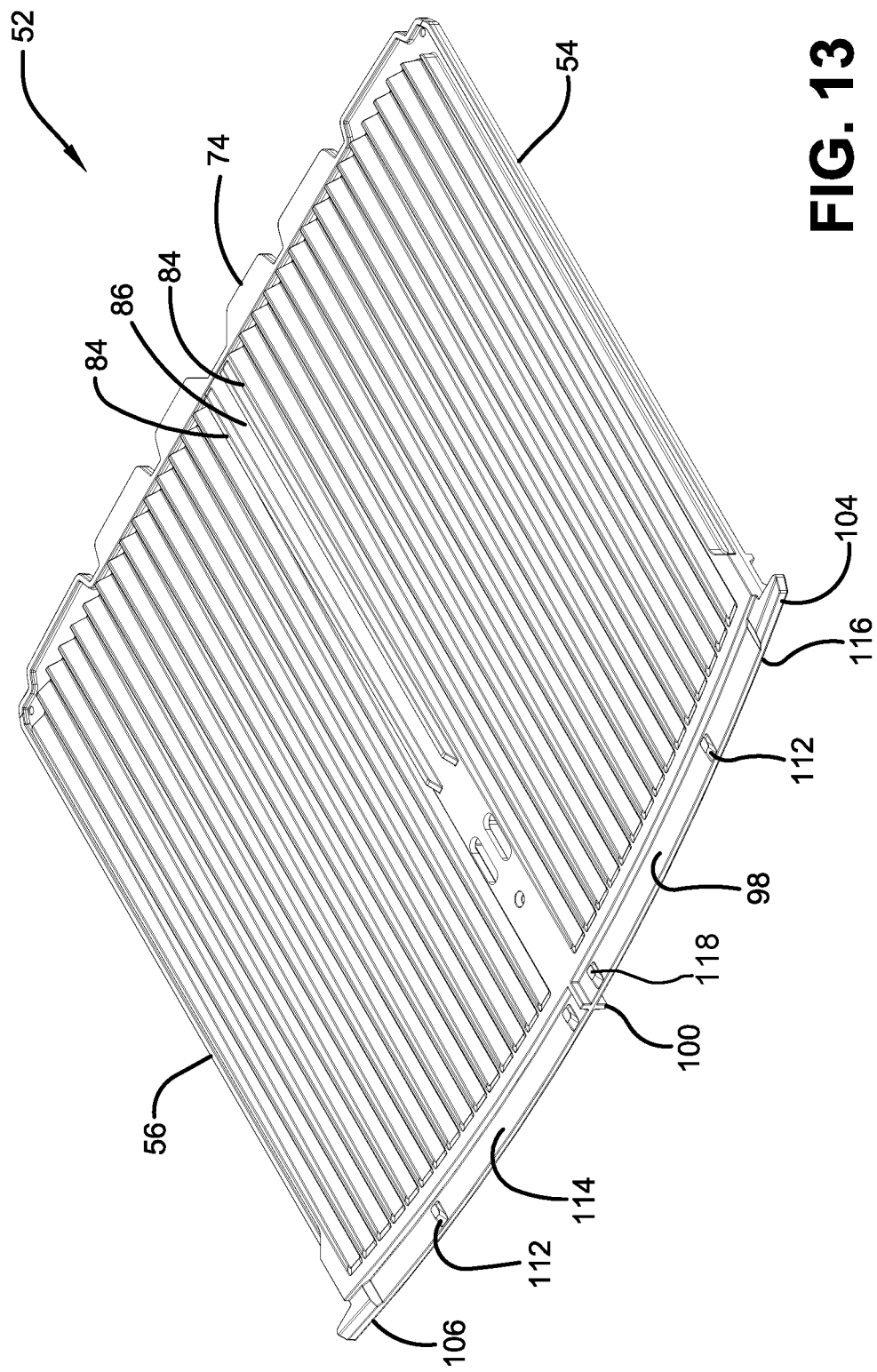
FIG. 13 is a perspective view of an exemplary shelf of the repository showing a top portion thereof.
Figure 14:
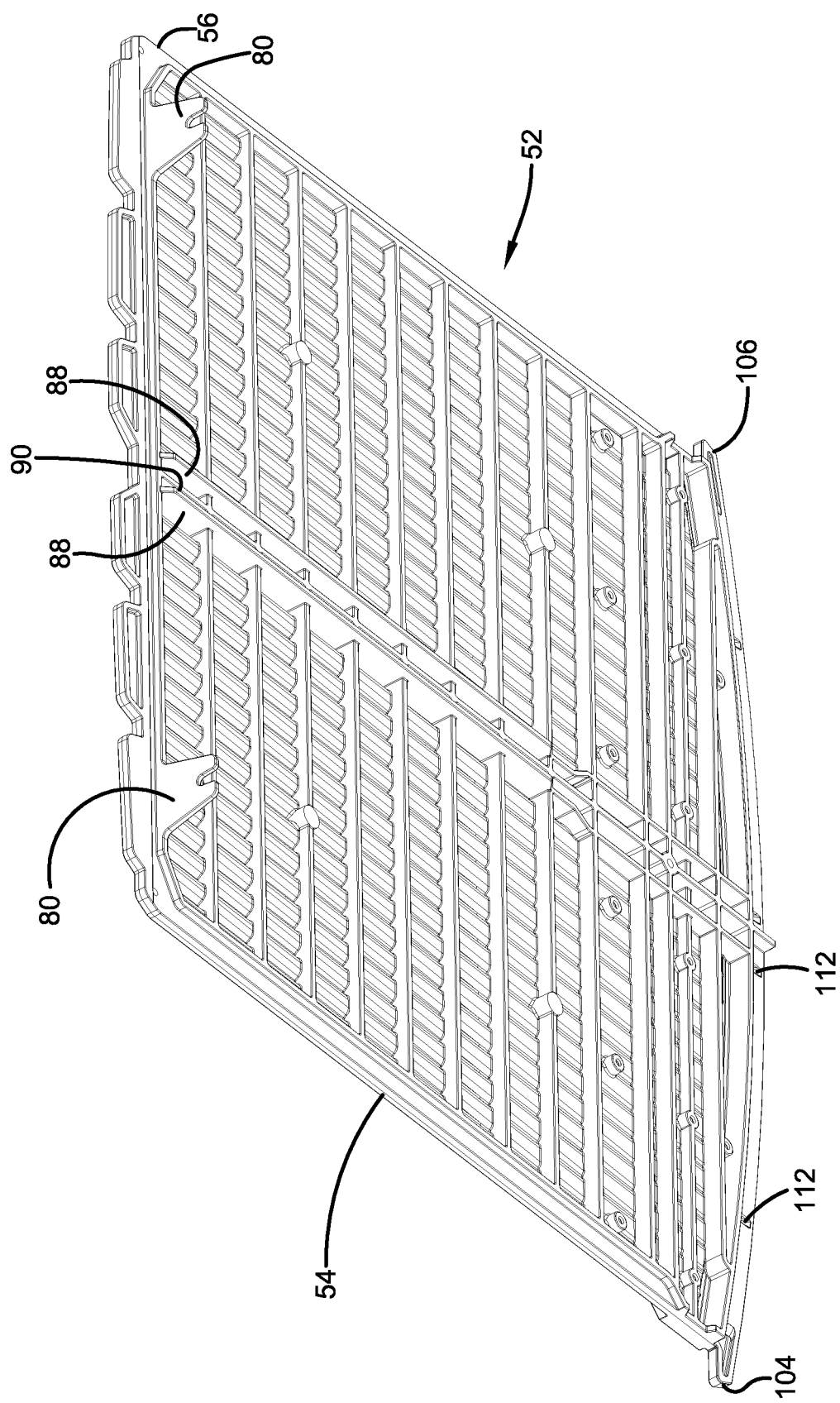
FIG. 14 is a perspective view showing the underside of the shelf.
Figure 15:
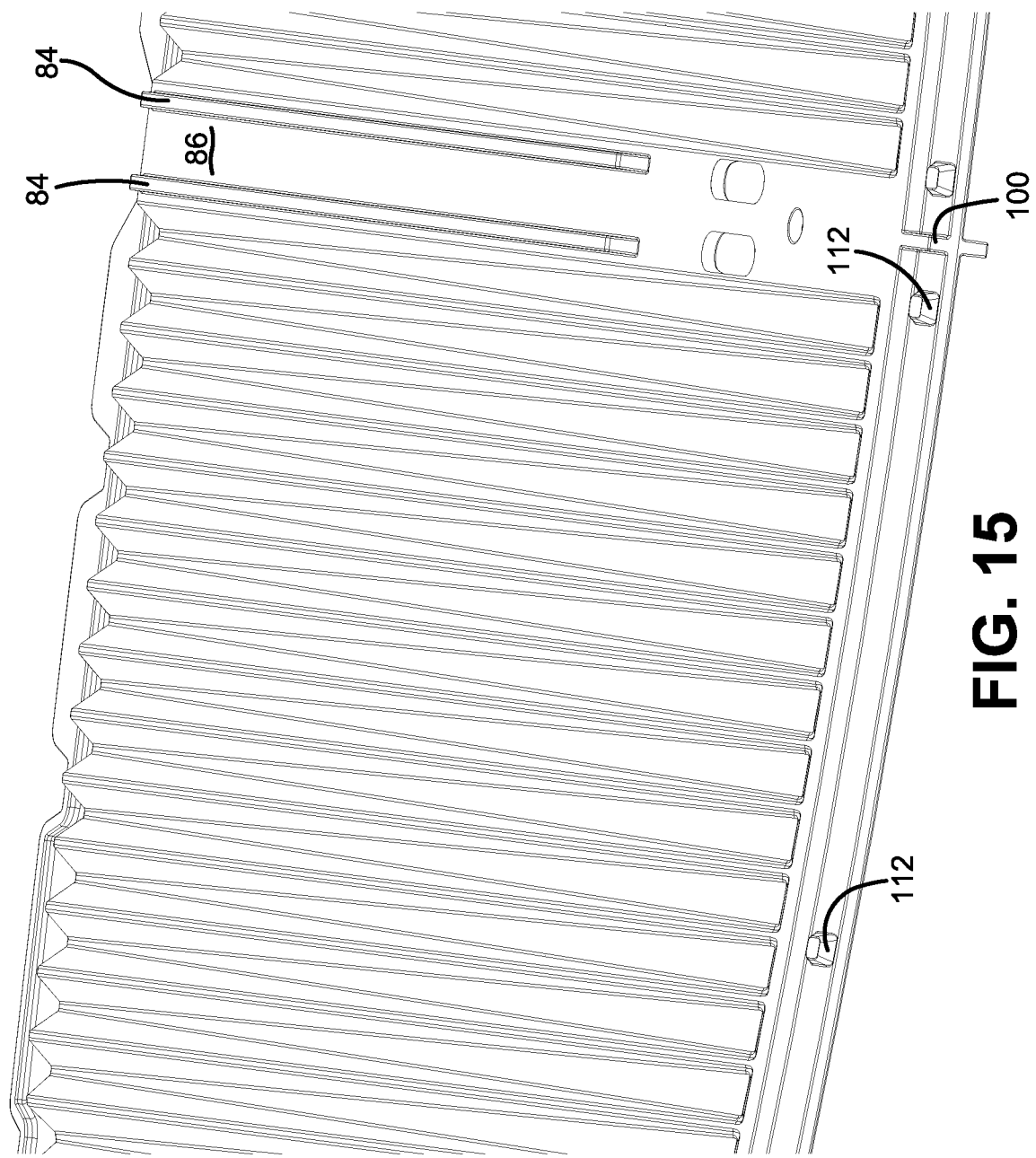
FIG. 15 is an enlarged view of the exemplary shelf showing the tapered ramp surfaces on a frame piece of the exemplary shelf.
Figure 21:
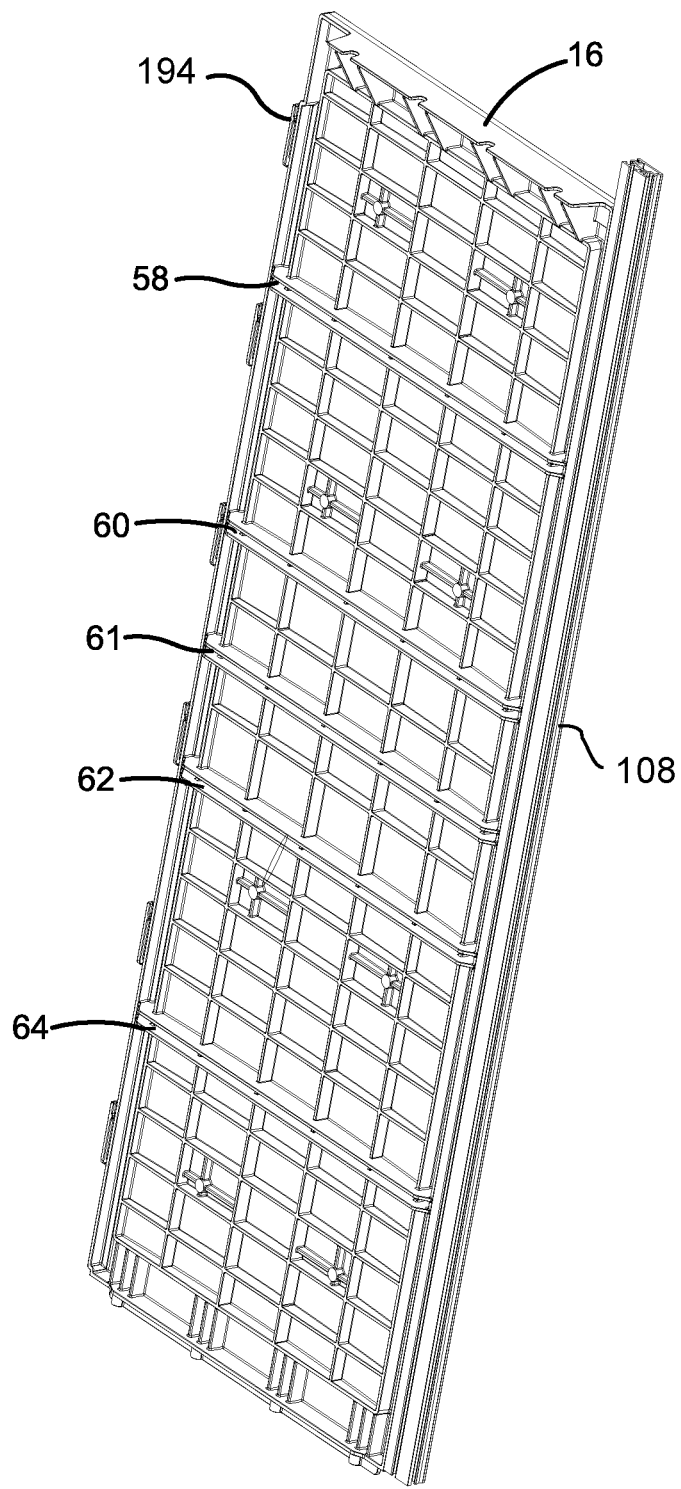
FIG. 21 is a perspective view showing an interior side of a right side exterior wall and a channel of an exemplary repository in engaged relation.
Figure 23:
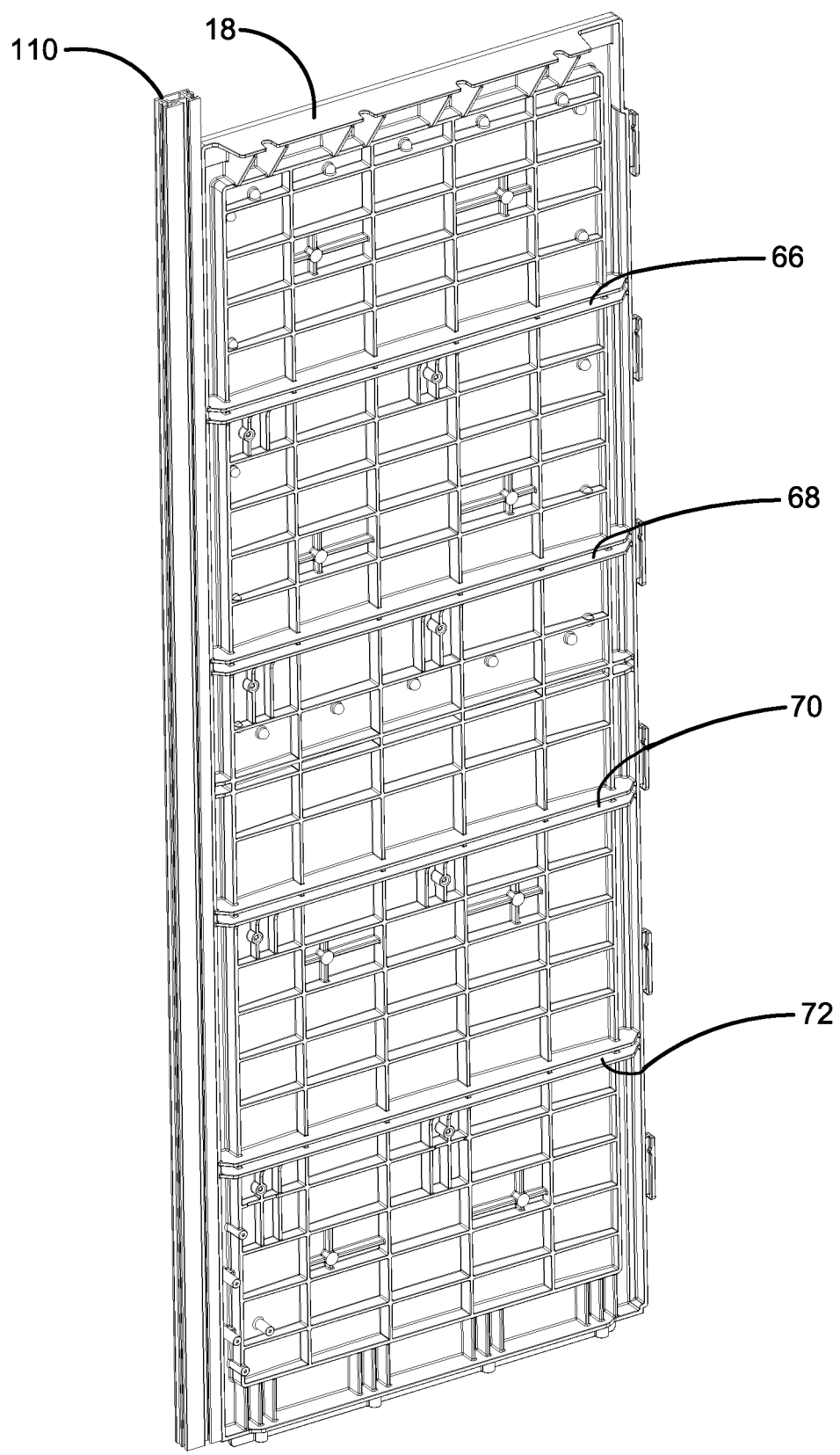
FIG. 23 is a perspective view showing an interior side of a left side exterior wall and a channel of an exemplary repository in engaged relation.

The exemplary repository 10 further includes a plurality of horizontally extending shelves within the interior area. The horizontally extending shelves horizontally divide and separate the compartments within the repository. An exemplary shelf 52 is shown in FIGS. 13-15. The exemplary shelf 52 includes a pair of transversely extending side portions 54 and 56. Side portions 54 and 56 are configured to engage in horizontally extending slots that extend on the inside faces of the right side wall 16 and the left side wall 18 respectively. For example in the exemplary arrangement shelf side portion 54 may be engaged in one of slots 58, 60, 62 or 64 which extend on the inside face of right side wall 16 as shown in FIG. 21. Likewise, shelf side portion 56 may be engaged in one of slots 66, 68, 70 or 72 which extend on the inside face of left side wall 18 as shown in FIG. 23. In the exemplary arrangement the engagement of the shelf side portions in a respective pair of parallel slots in the side walls is operative to hold the shelf in supported engagement with the body of the repository.

Figure 28:
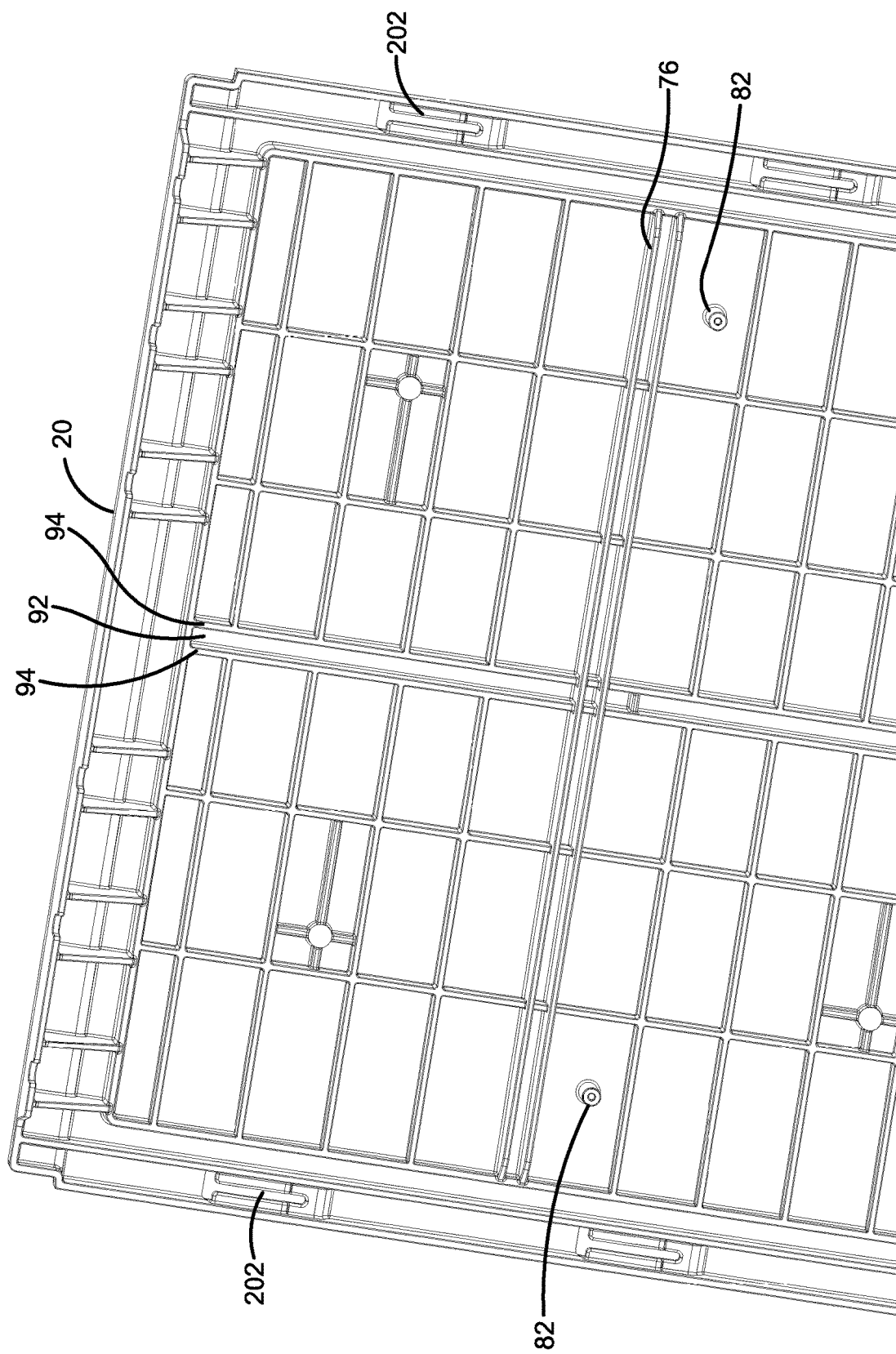
FIG. 28 shows an enlarged view of the interior face of the back wall.

The exemplary shelf 52 further includes a plurality of spaced rearward extending projections 74 that extend from the rear side thereof. In the exemplary arrangement projections 74 are configured to extend in slots such as slots 76, 78 on the inside face of the back wall 20 as shown in FIG. 28. In the exemplary arrangement the slots that extend in the back wall 20 are in horizontally aligned relation with the slots that extend in the side wall. The engagement of the projections 74 and the associated slots on the inside face of the back wall are further operative to provide support for the respective shelf. Further the exemplary configuration of shelf 52 includes fastener engaging projections 80 that extend from the underside thereof. The exemplary fastener engaging projections 80 are configured to accept fasteners therein that engage openings in inward extending bosses 82 that extend inwardly on the inside face of the back wall 20. As can be appreciated, fasteners such as screws may be extended through the openings in a projection 80 and a boss 82 to hold the shelf in fixed operative engagement with the body. Of course this approach is exemplary and in other arrangements other approaches may be used.

The exemplary shelf 52 further includes a pair of transversely disposed upper central projections 84. The upper central projections 84 are configured to engage a divider such as divider 38. A divider is enabled to be securely held in a recess 86 that extends between the projections 84. As a result the projections are operative to prevent the divider from being displaced by an individual who may have access to one compartment but not the compartment on the other side of the divider. Further as shown in FIG. 14 the exemplary shelf 52 includes a pair of lower central projections 88. A recess 90 extends transversely between the pair of lower central projections 88. The projections 88 are operative to hold an upper side of a vertically extending divider in position between the immediately adjacent horizontal shelves. Further in the exemplary arrangement the inside face of the back wall 20 includes recesses 92 as shown in FIG. 28. The recesses 92 are bounded by transversely disposed pairs of inward extending projections 94. In the exemplary arrangement the rear face of the vertically extending dividers are configured to engage in the recesses 92 which further helps to hold the dividers in position. Further in this exemplary arrangement a lower wall on the interior of the top portion 24 also includes a recess that engages an upper portion 96 of the vertically extending divider 38 between the uppermost compartments 26 and 28. Of course this approach for holding the vertical dividers in place within the repository is exemplary and in other arrangements other approaches may be used.

The exemplary shelf 52 further includes at least one horizontally extending frame piece 98 at a forward portion thereof. In the exemplary arrangement frame piece 98 is integrally formed with the remainder of the horizontally extending shelf. Frame piece 98 is operative to bound the respective adjacent openings to the compartments that are above and below the frame piece. Further, the frame piece 98 extends in intermediate relation of immediately vertically adjacent doors of the repository when the doors are in the closed position. The exemplary frame piece further includes a vertically extending central portion 100. The exemplary central portion 100 extends both in an upward direction and a downward direction from the forward extending frame piece. As shown in FIG. 5 the central portion is aligned with a forward projection 102 that extends forwardly at the front of each vertically extending divider. Each forward projection 102 extends between immediately horizontally adjacent doors of the repository when the doors are in the closed position.

In the exemplary arrangement each frame piece of shelf 52 includes outward extending peripheral portions 104, 106. In the exemplary arrangement the peripheral portions extend at the opposed transverse outward ends of the frame piece 98. The peripheral portions further extend beneath the respective door that is positioned immediately above the frame piece, and above the respective door that is positioned immediately below the frame piece. The exemplary peripheral portions are of greater thickness in the vertical direction than other portions of the frame piece 98. Further in the exemplary arrangement peripheral portion 104 extends forwardly of a right side channel 108 that is in attached connection with right side wall 16. Similarly peripheral portion 106 extends forwardly of a left side channel 110 that is in attached connection with left side wall 18.

In the exemplary arrangement each frame piece 98 includes a plurality of transversely spaced tapered ramp surfaces 112. The tapered ramp surfaces 112 are configured to be tapered outwardly from a generally flat strip surface 114 that extends on the frame piece between the ramp surfaces. The exemplary tapered ramp surfaces 112 extend further outwardly from the flat strip surface with increasing inward distance from an outward edge 116 of the frame piece 98. In the exemplary arrangement the tapered ramp surfaces terminate outwardly in a generally flat outer surface 118. Of course it should be understood that this configuration is exemplary and in other arrangements other ramp surface configurations may be used. This may include for example, ramp surfaces that are more numerous in number or that have a greater width across the frame piece for example. In the exemplary arrangement the tapered ramp surfaces 112 extend vertically outwardly from both the top and bottom of the frame piece 98. However in other exemplary arrangements the tapered ramp surfaces may extend only from one of the top or the bottom of the frame piece.

In the exemplary repository arrangement interior area compartments of different sizes are provided. For example the compartments associated with doors 33 and 35 are half the size of the compartments associated with doors 32 and 34. Further the lowest compartment of the exemplary repository that is associated with door 37 is twice the size of the compartments associated with doors 32 and 34. As can be appreciated, in the exemplary arrangement because the compartment associated with door 37 spans the entire width of the repository, the lock that is associated with door 37 is in fixed operative connection with the inside face of the left side wall 18 rather than a central divider as is the case with the other doors of the exemplary arrangement. Of course it should be understood that numerous different sized compartments may be provided in exemplary repositories.

Figure 18:
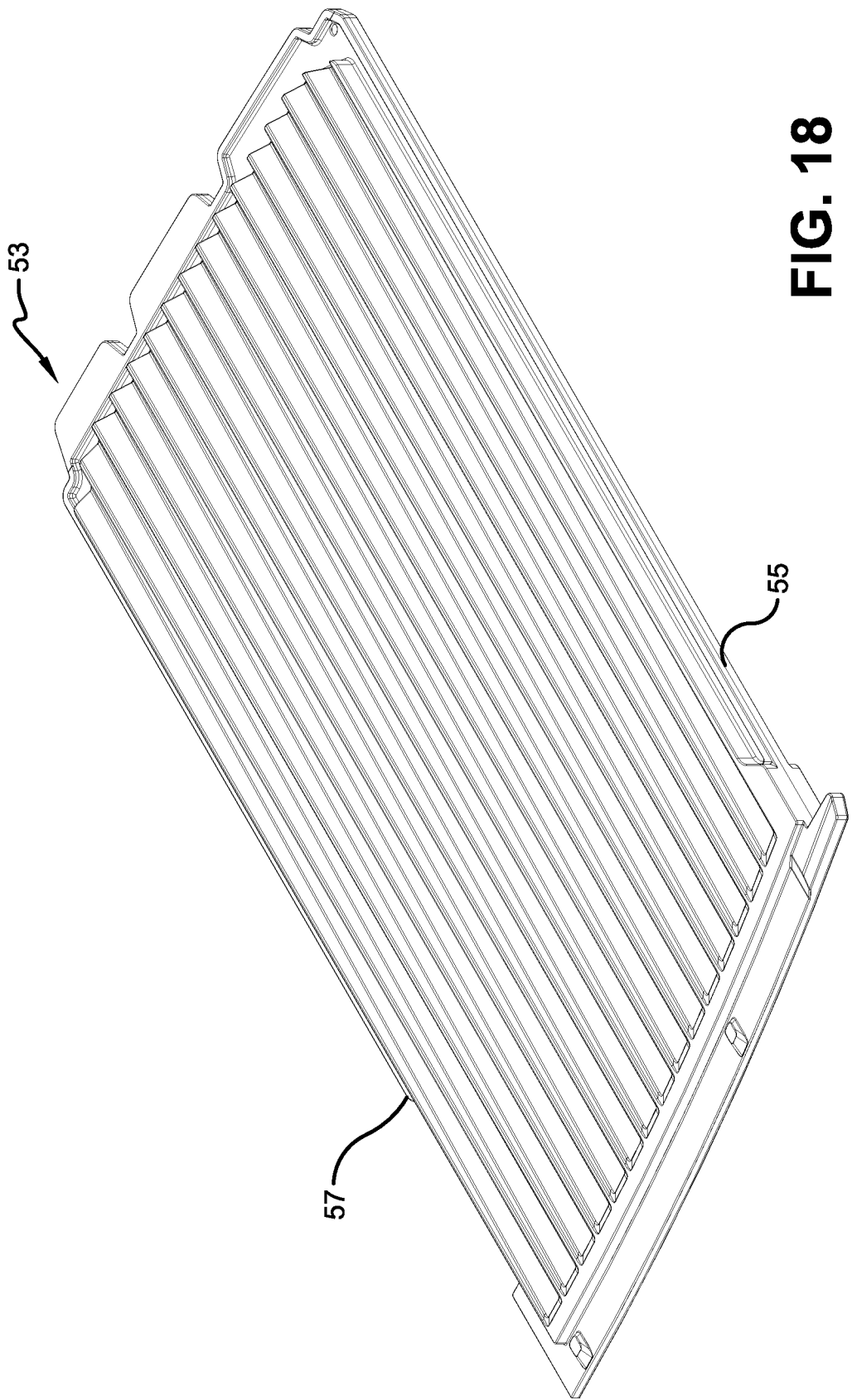
FIG. 18 is a perspective view of a further exemplary shelf used in the exemplary repository.

Further in exemplary arrangements the smaller compartments associated with doors 33 and 35 are separated internally within the repository. This is accomplished in the exemplary arrangement through the use of a shelf 53 which is shown in FIG. 18. Shelf 53 includes features similar to shelf 52 previously described, except that is only half as wide as shelf 52.

Figure 16:
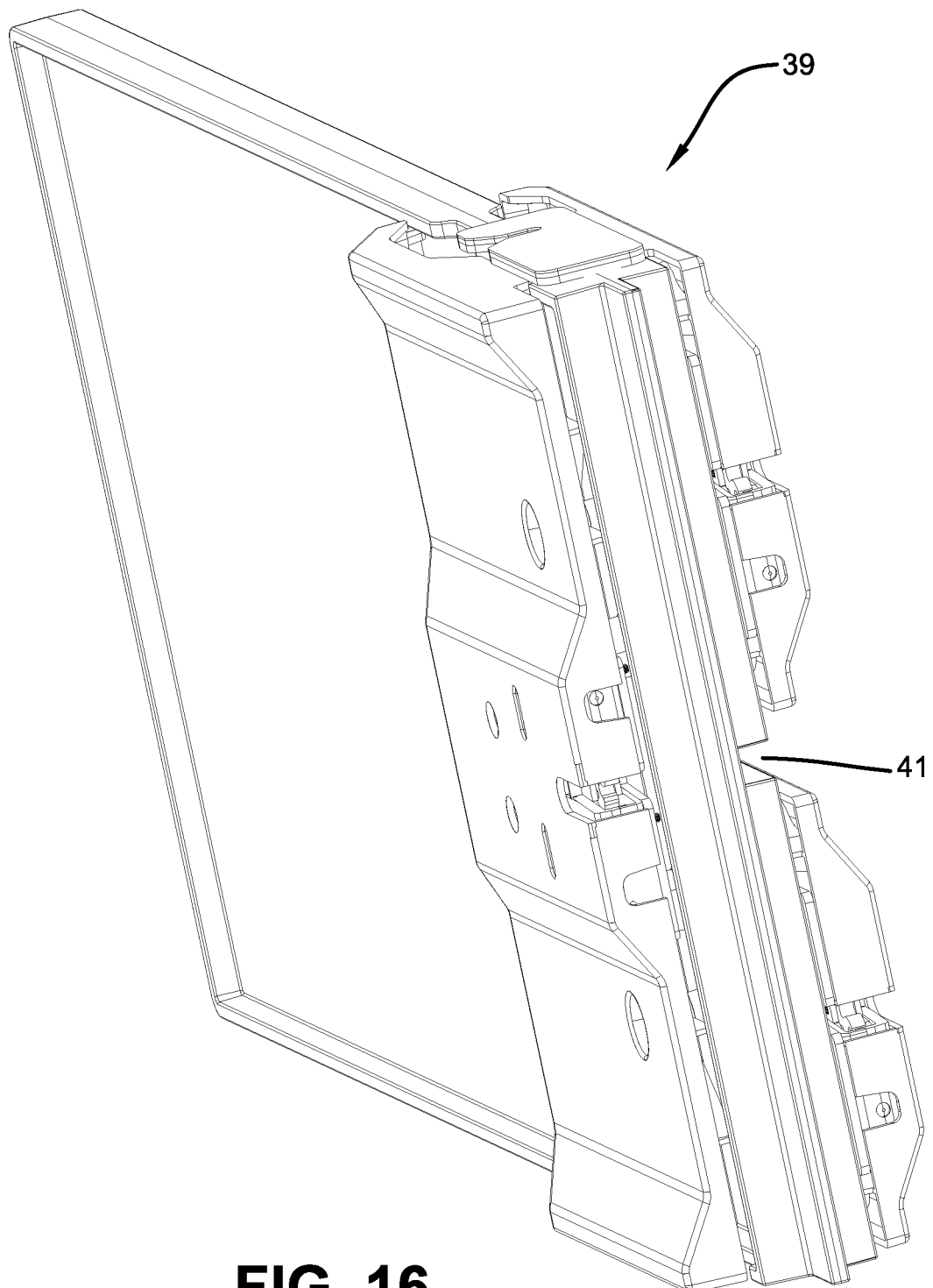
FIG. 16 is a perspective view of a vertical divider used to separate compartments in the exemplary repository.
Figure 17:
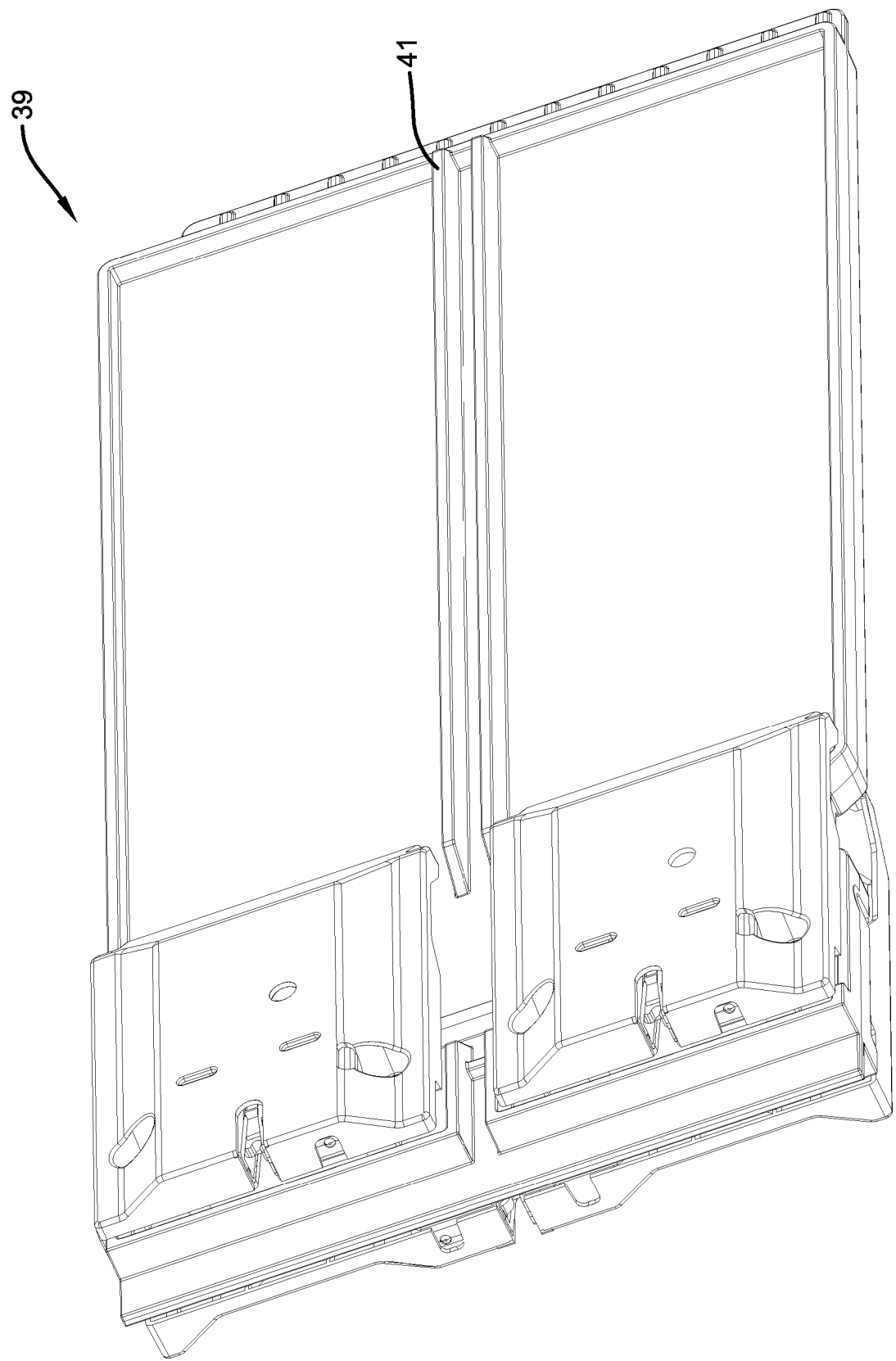
FIG. 17 is a further perspective view of the exemplary divider.

Shelf 53 includes a side portion 55 that is configured to engage in a slot 61 that extends on the inside face right side wall 16. The opposed side of the shelf 53 includes a shelf side portion 57 that is engaged in a slot 41 in a divider 39 that is shown in FIGS. 16 and 17. Divider 39 is similar to divider 38 previously discussed, and is mounted in a similar manner. However as can be appreciated, divider 39 includes a pair of locks that enable controlling the locked and unlocked conditions of doors 33 and 35. Of course numerous different configurations for dividers may be utilized such that exemplary repositories may include numerous different sizes and configurations of compartment interior areas.

Figure 6:
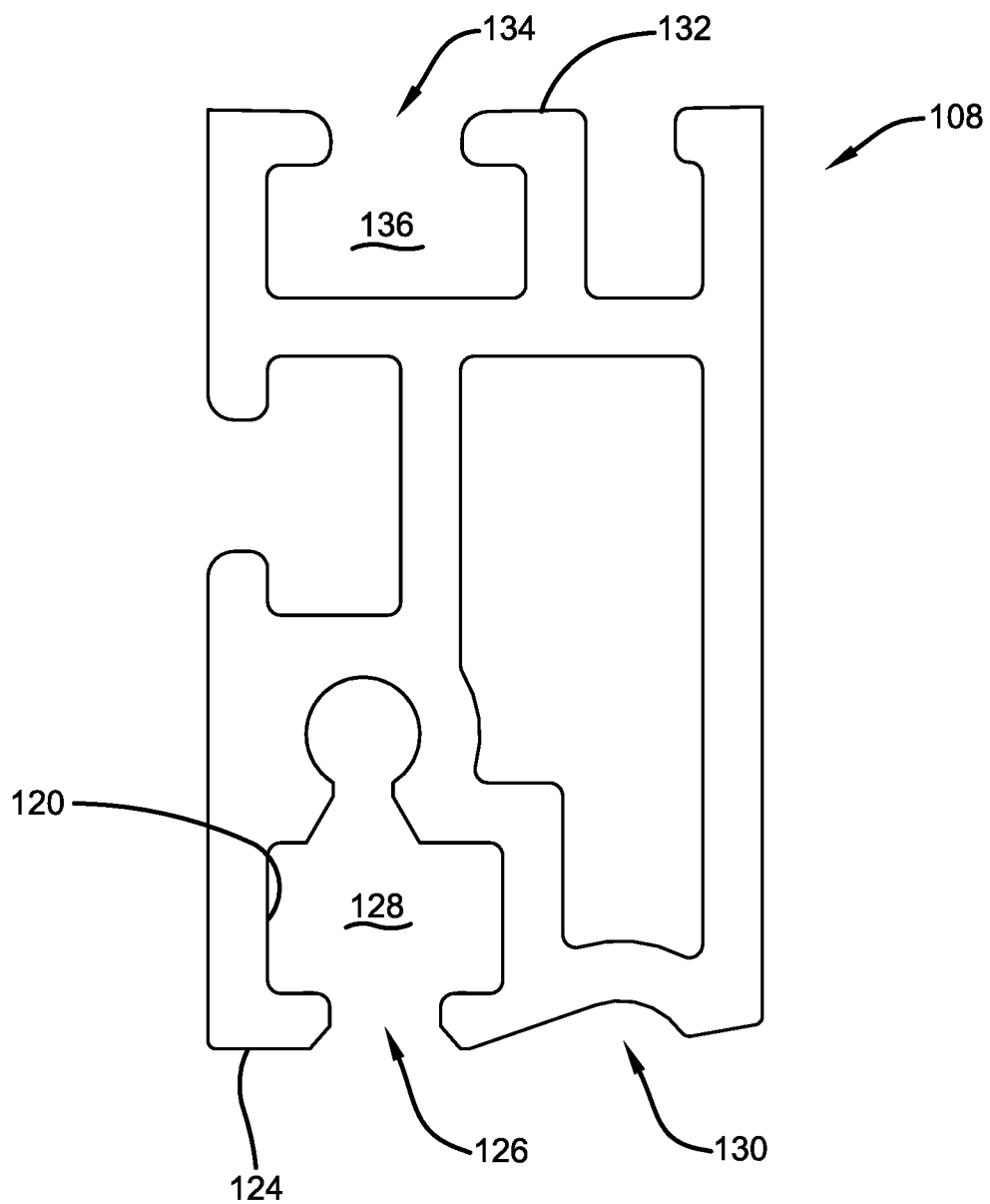
FIG. 6 is a cross-sectional view of an exemplary channel used in the exemplary repository.
Figure 7:
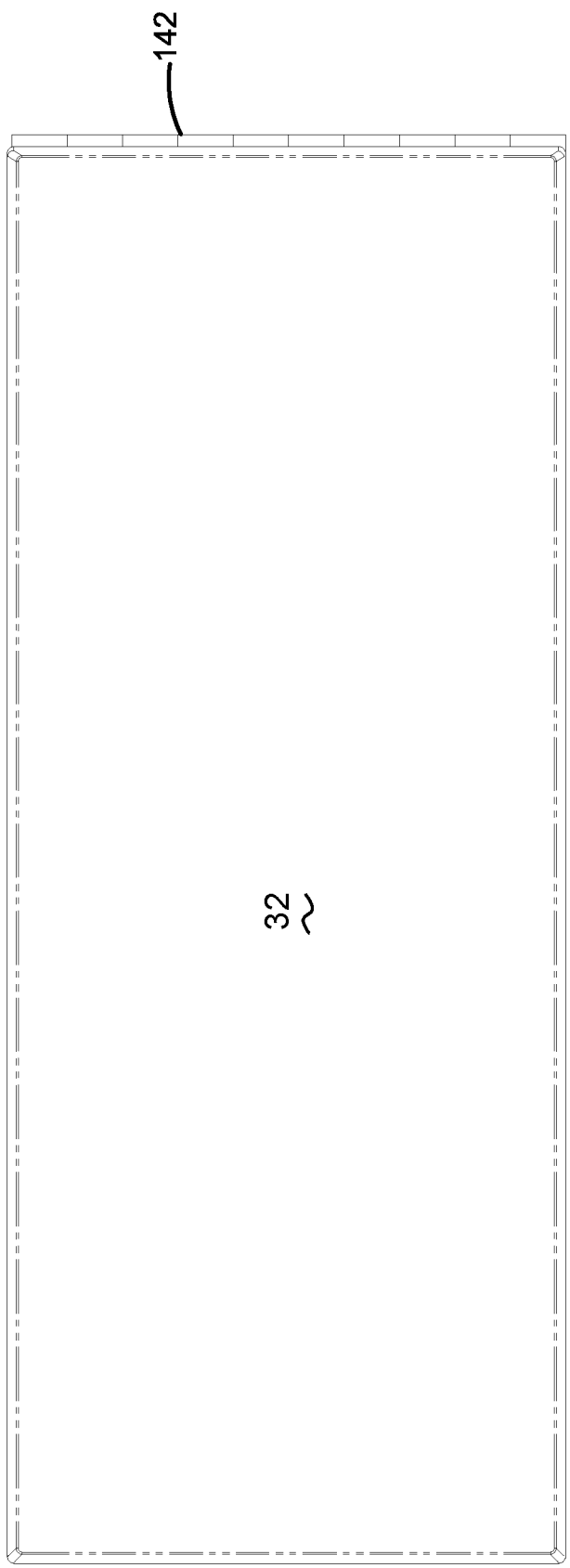
FIG. 7 is a front view of an exemplary repository door.
Figure 8:
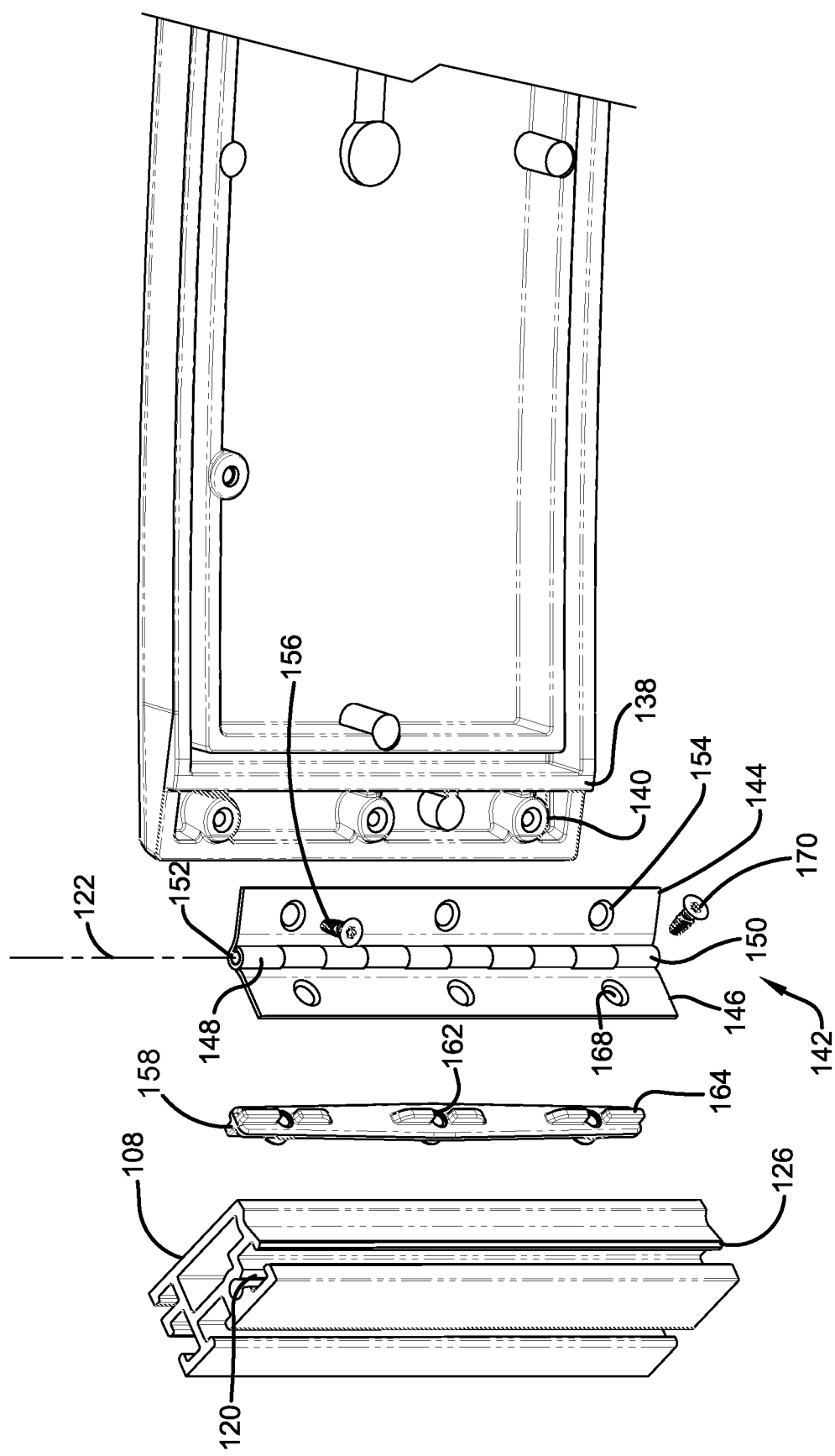
FIG. 8 is an exploded view of a portion of the repository including components used in the mounting of an exemplary door.
Figure 9:
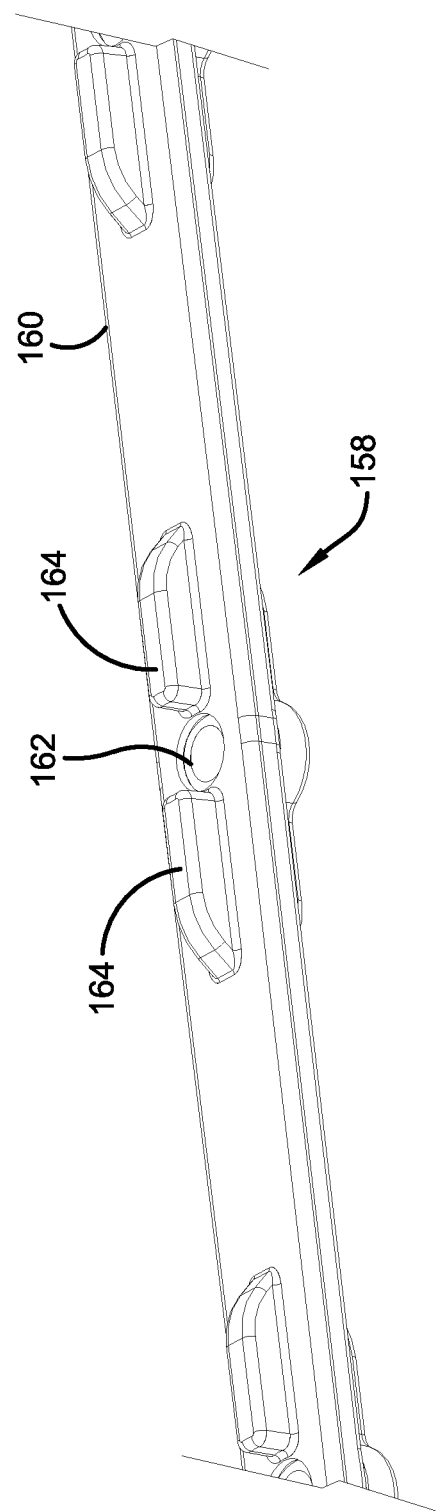
FIG. 9 is a perspective view showing a front side of an exemplary mounting strip used in the mounting of a repository door.
Figure 10:
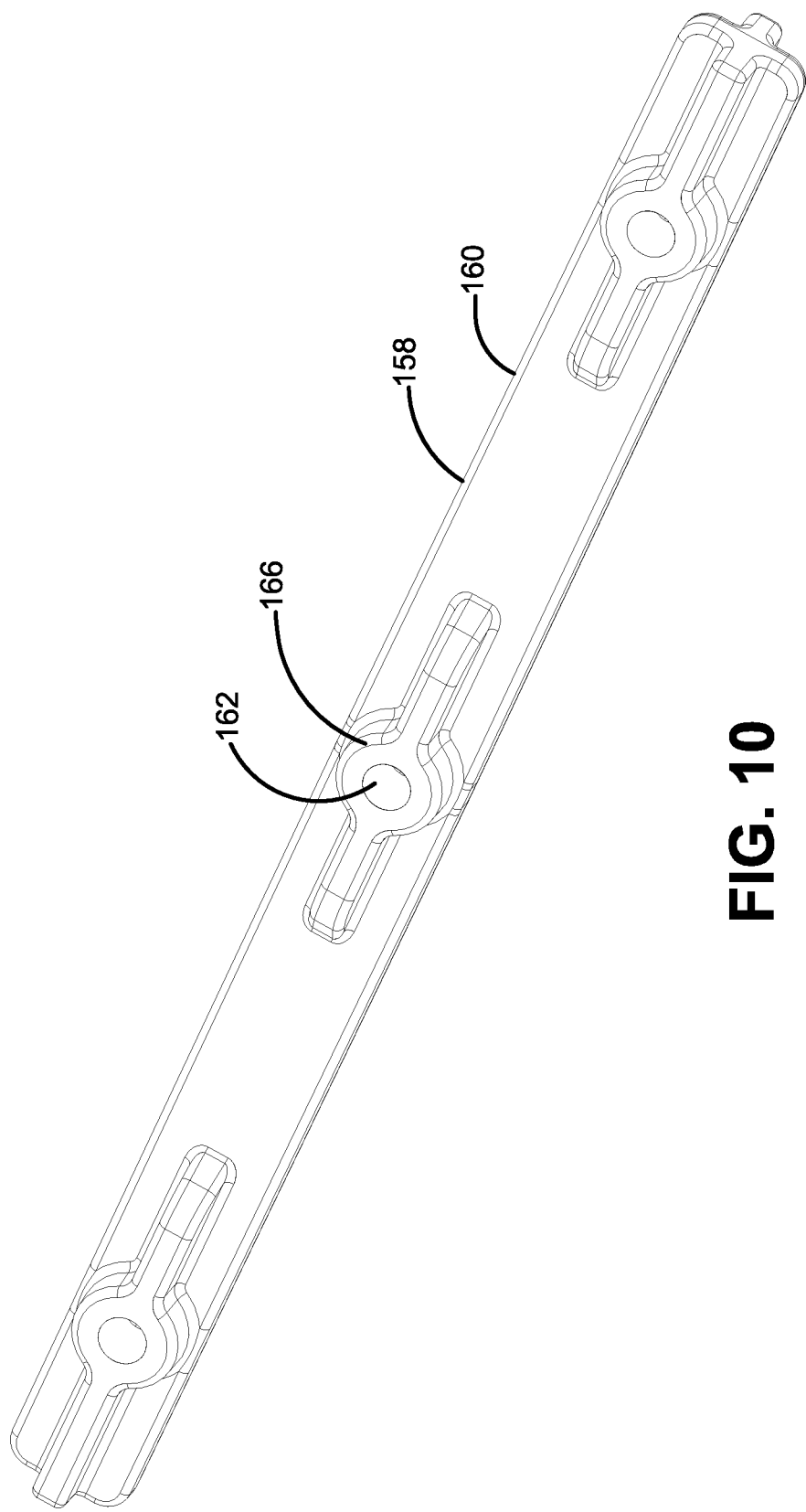
FIG. 10 is a further perspective view showing a rear side of the exemplary mounting strip.
Figure 11:
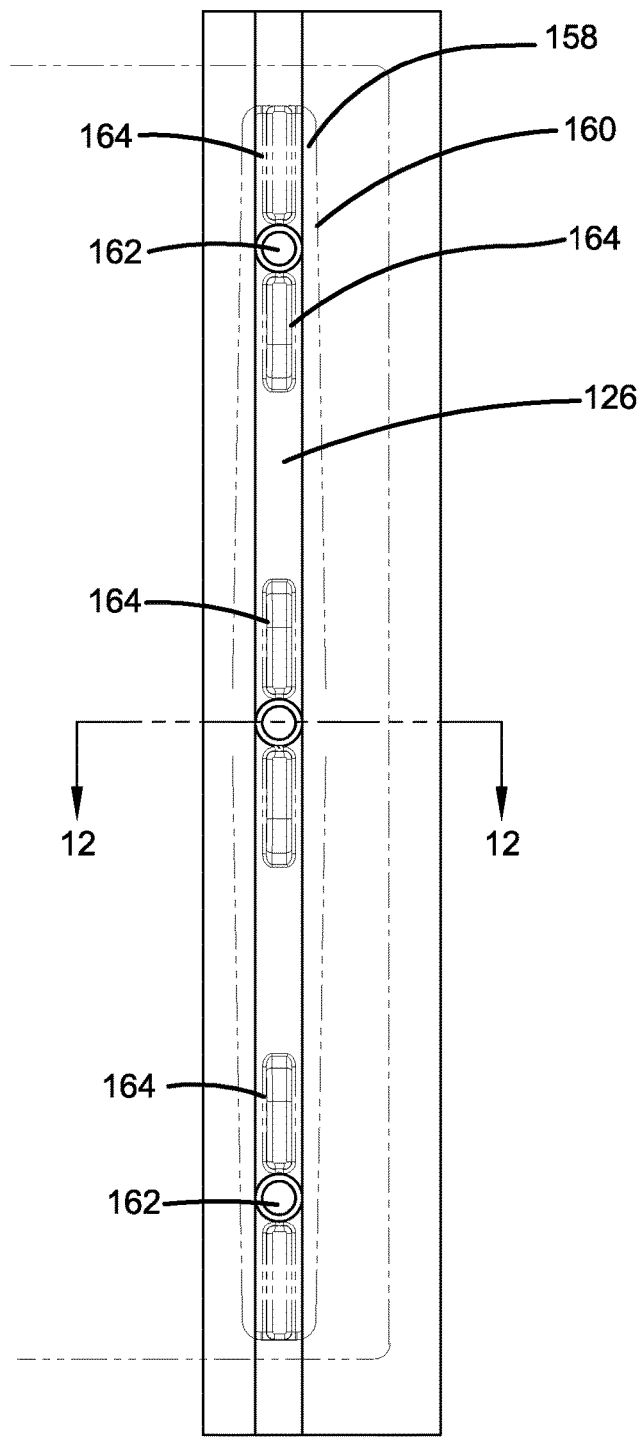
FIG. 11 is a view showing the exemplary mounting strip within a track of a channel.

The exemplary channels 108, 110 which extend at the front of walls 16 and 18 respectively are shown in cross-section in FIG. 6. In FIG. 6 the channel is shown positioned in the manner of the right side channel 108 in the exemplary arrangement. As can be appreciated, a left side channel 110 of the exemplary arrangement has the same transverse cross-sectional configuration as channel 108 except that in the operative position, channel 110 is rotated 180° from the position of channel 108. Of course while in the exemplary arrangement the channels that are utilized include identical transverse cross-sections, and in other arrangements different cross-sectional channel configurations and other structures may be used on opposed sides of the repository.

In the exemplary arrangement the channels 108, 110 are operative to provide for attached engagement of a respective repository side wall and the movable doors that are mounted in operative connection with the repository. The configuration of the exemplary channels which provide this capability will be described in detail with regard to the right side channel 108. However as can be appreciated, the left side channel 110 provides the same capability in the exemplary arrangement as it is arranged as the mirror image of the structures that are utilized in connection with the right side channel.

The exemplary channel 108 includes a track 120 thereon. The exemplary track 120 extends vertically in the operative position of the repository. The exemplary track 120 further extends axially along an axis that is parallel to an axis of rotation 122 about which the doors that are located on the right side of the repository, such as door 32, rotate when moving between the open and closed positions.

The exemplary channel 108 includes in transverse cross-section a generally planar outer track face surface 124. A slot 126 extends inwardly in the channel such that the slot extends along a direction that is perpendicular to the outer track face surface. As used herein the term generally planar with regard to the outer track face surface means that the face surface on each transverse side of the slot 126 extends within a common plane. In the exemplary arrangement an axially elongated recess 128 is disposed inwardly in the channel away from the outer track face surface 124. The exemplary recess 128 is wider than slot 126 in a direction parallel to the outer track face surface. Further in the exemplary arrangement the outer track face surface 124 includes an axially extending recess 130.

The exemplary channel 108 further includes in transverse cross-section, a wall engaging face 132. In the configuration of the exemplary channel, the wall engaging face 132 is disposed on the channel from the outer track face surface 124, but extends in a direction parallel to the outer track face surface 124. A wall slot 134 extends inwardly in the channel from the track face surface. The wall slot 134 extends in a direction that is perpendicular to the wall engaging face 132. A wall recess 136 is disposed inwardly from the wall engaging face within the channel 108. The exemplary wall recess is wider in a direction parallel to the wall engaging face than the slot. The exemplary channel further includes other recesses therein. These recesses of the exemplary arrangement are used for purposes that are later discussed. Of course it should be understood that this channel configuration is exemplary and in other arrangements other approaches may be used.

In the exemplary arrangement the track 120 is used for movably mounting the doors that control access to the compartments of the repository in attached connection with the body of the repository such that the doors are both rotatably movable about the axis 122 as well as vertically movable along the axis. The exemplary mounting arrangement of the doors of the repository is represented in FIGS. 7-10. Each door such as door 32 for example, includes an inside face 138. The inside face of the door includes a plurality of fastener accepting apertures 140 on the lateral side of the door opposite the locking bolt. A hinge 142 includes a pair of relatively movable hinge leafs 144, 146. Each exemplary hinge leaf includes knuckle portions 148, 150. A hinge pin 152 extends axially through the plurality of knuckle portions 148, 150 such that the hinge leafs 144, 146 are held together in engaged relation while being relatively rotationally movable about the hinge pin and the axis 122.

Hinge leaf 144 includes a plurality of fastener accepting opening 154. The fastener accepting leaf openings 154 are configured to accept fasteners 156 therein. The fasteners 156 extend through the respective fastener accepting leaf openings 154 and are engaged with the apertures 140 of the door.

A mounting strip 158 extends in the track 120 of the channel 108. The exemplary mounting strip 158 includes in transverse cross-section, a base 160. The base includes a plurality of disposed fastener accepting openings 162 that extend through the base. The base further includes pairs of axially aligned, spaced projections 164. The projections of each pair extend on opposed axial sides of a respective fastener accepting opening 162. The projections 164 in the operative position of the mounting strip extend forward in the slot 126. In the exemplary arrangement the projections 164 are sized so that the projections are axially movable while engaged in the slot.

In the exemplary configuration the base 160 of the mounting strip 158 is configured to extend in the recess 128. The base 160 of the exemplary arrangement is wider than the projections 164 in a direction parallel to the outer track face surface 124. As a result while the mounting strip is insertable vertically in the recess 128 of the track 120, in the operative position in which the projections 164 extend in the slot 126, the base is prevented from passing outwardly through the slot. As a result the exemplary mounting strip is prevented from being pulled outwardly from the recess 128 through the slot. Further in the exemplary arrangement the mounting strip 158 includes reinforcing projections 166 on an opposed side of the base from the projections 164 that extend in the slot 126. In the exemplary arrangement the reinforcing projections 166 extend in surrounding relation of the fastener accepting openings 162 to provide improved engagement between the mounting strip and fasteners that extend through the fastener accepting openings.

Figure 12:
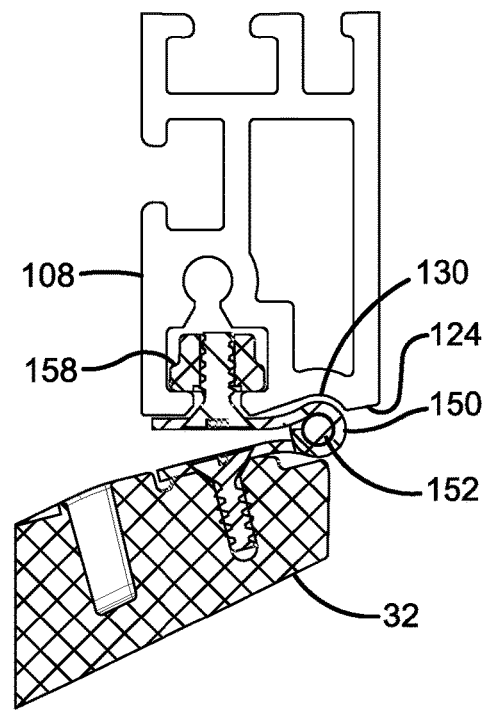
FIG. 12 is a cross-sectional view taken along line 12-12 in FIG. 11.

In the exemplary door mounting arrangement, hinge leaf 146 includes a plurality of fastener accepting openings 168. Respective fasteners 170 extend through a respective fastener accepting opening, in the slot 126, and engage a respective fastener accepting opening 162 in the mounting strip 158. As a result the fasteners hold the hinge 142 in operatively engaged relation with the body of the repository through the track 120 while enabling the fasteners, the hinge and the door, to be axially movable along the axis 122. Further as shown in FIG. 12 the knuckle portions 148, 150 of the hinge are enabled to axially move in the axially extending recess 130 of the outer track face surface 124. As a result the knuckle portions of the hinge do not engage the outer track face surface and impede the rotational or axial movement of the hinge of the exemplary arrangement.

Of course it should be understood that the arrangement shown which provides both rotational and axial movement of the door relative to the body, is exemplary and in other arrangements other approaches may be used. For example, in some arrangements the axially extending track may be in fixed operative connection with the interior face of the door, rather than the forward face of the body. In such arrangements a mounting strip similar to mounting strip 158 may extend in the track and enable movement of the door relative to the leaf of the hinge through which the fasteners extend that are engaged with the door. In such arrangements the leaf of the hinge which is directly engaged with the body may be axially fixed relative to the body. Further in other exemplary arrangements the knuckle portions of the hinge structure may have the immediately adjacent surfaces thereof axially spaced from one another so that the hinge leafs may move relative to one another in the axial direction as well as in the rotational direction. Such axial gaps that extend between the immediately adjacent knuckle portions may provide suitable axial play so as to achieve suitable rotational movement of the door about the axis as well as the necessary degree of axial movement. Numerous arrangements may be utilized in exemplary arrangements to provide relative axial and rotational movement of the doors relative to the body.

The movement of the doors in an axial direction relative to the body is desirable in exemplary arrangements in which components which make up the body of the repository are comprised of materials which may undergo changes in configuration and dimensions as a result of changes in temperature or aging of the materials. For example in some exemplary arrangements the walls, shelves and other structures which make up the body of the repository may be comprised of thermoplastic materials such as polyethylene and/or polypropylene. Further in exemplary arrangements some structural components such as the channels may be comprised of materials that have different coefficients of thermal expansion such as steel or aluminum.

In such exemplary arrangements the different coefficients of thermal expansion may cause the doors, shelves or other structures to bind and impede the opening and closing of the doors. In the exemplary arrangements the tapered ramp surfaces 112 which extend on the frame pieces 98 operate to suitably align the doors regardless of dimensional changes that may occur. In such arrangements the ramp surfaces are operative to engage the lower and/or upper surfaces bounding a door and axially move the door as the door moves from the open position to the closed position. Further in the exemplary arrangements the peripheral portions 104, 106 of the shelves are operative to engage the doors when they are in the open position and limit the axial travel of the doors so that the doors will engage the tapered ramp surfaces and be moved axially into alignment with the respective opening as the door moves from the open position to the closed position. This capability of the exemplary arrangement enables the exemplary repository to be comprised of molded thermoplastic and other materials that provide desirable properties in the operation of the parcel repository. Of course it should be understood that these approaches are exemplary and in other arrangements other approaches may be used.

Figure 22:
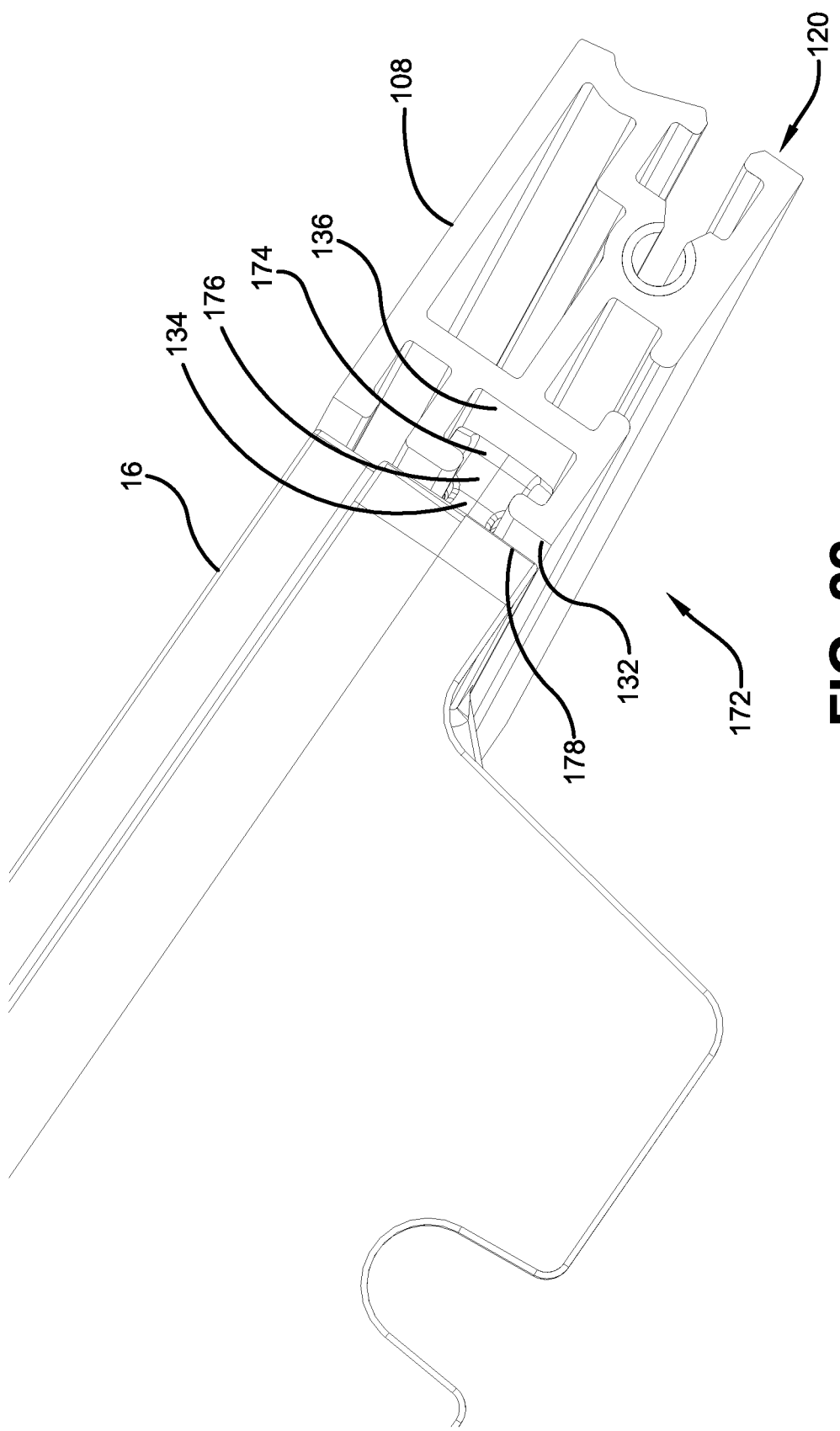
FIG. 22 is a perspective view showing engagement of a wall end of the exterior wall shown in FIG. 21, with the channel.

In the exemplary arrangement the sidewalls of the repository are in operatively engaged relation with the respective channels through interengaging projections and recesses. This arrangement facilitates the construction of the repository and also serves to preserve the integrity of the repository structure. For example as shown in FIGS. 21 and 22 the exemplary right side wall 16 includes a wall end 172 that has a transverse cross-sectional configuration that engages with channel 108 on the side of the channel opposite the track 120 through which the hinges are mounted to the body. As best shown in FIG. 22, the wall end 172 includes in transverse cross-section a head portion 174. The head portion 174 is configured to extend in engaged relation in the wall recess 136.

The exemplary wall end 172 further includes in transverse cross-section a neck portion 176. Neck portion 176 is disposed away from the head portion 174 and is smaller than the head portion in transverse cross-section. The neck portion 176 extends through the wall slot 134. The exemplary wall end 172 further includes a forward wall face 178 that extends on both sides of the neck portion 176 and is in close fitting and/or abutting relation with the wall engaging face 132 of the channel 108. Further the exemplary wall 16 is of sufficient transverse thickness so as to extend outwardly so that the outer surface thereof is in aligned relation with the outer surface of channel 108. This provides for secure engagement between the channel 108 and the right side wall 16 which maintains the integrity of the repository body throughout the normal range of operating conditions.

Figure 24:
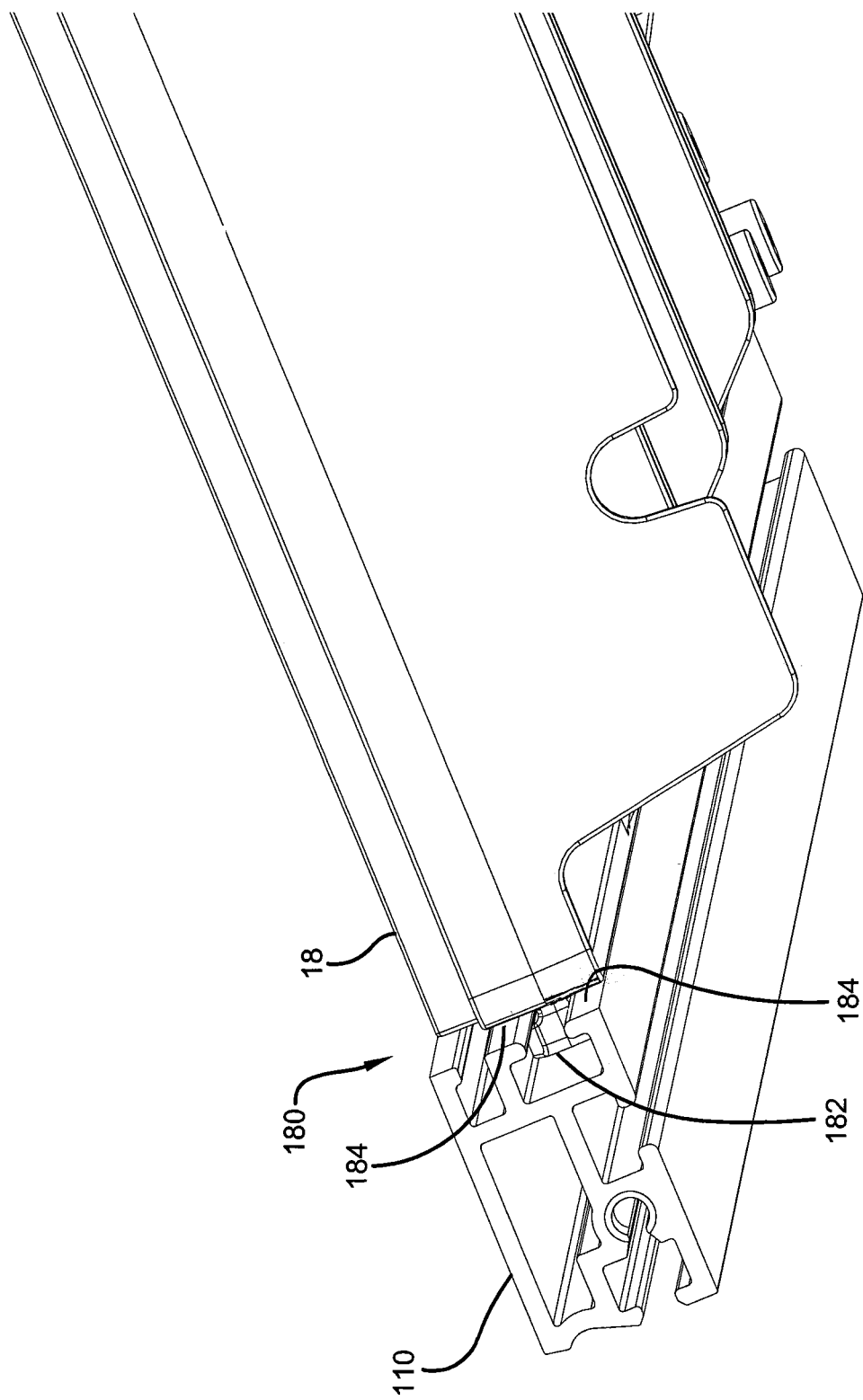
FIG. 24 is a perspective view showing engagement of a wall end of the exterior wall shown in FIG. 23 with the channel.

Further as shown in FIGS. 23 and 24 channel 110 is engaged to left side wall 18 in a manner similar to that of channel 108 and right side wall 16, but in a manner that is a mirror image thereof. As shown in FIG. 24 left side wall 18 includes a wall end 180. Wall end 180 includes in transverse cross-section a forward end that includes a head portion 182 and a neck portion 184 that extend in the wall recess 136 and slot 134 of channel 110 respectively. Further similar to side wall 16, side wall 18 includes a forward wall face 184 that extends in close adjacent and/or abutting relation with the wall engaging face 132 of the left side channel 110. As a result the secure engagement of the left side wall 18 and the left side channel 110 provides for secure engagement between the channel and the track to which the doors on the left side of the repository are mounted to the body of the repository.

Of course it should be understood that this arrangement for interengaging projections and recesses that are provided between the walls of the repository and the mounting structures which are used to attached the doors to the repository, is exemplary. In other arrangements other structures may be provided to provide suitable mounting capabilities while still maintaining structural integrity throughout a range of environmental and other conditions in which the repository is operated.

Figure 25:
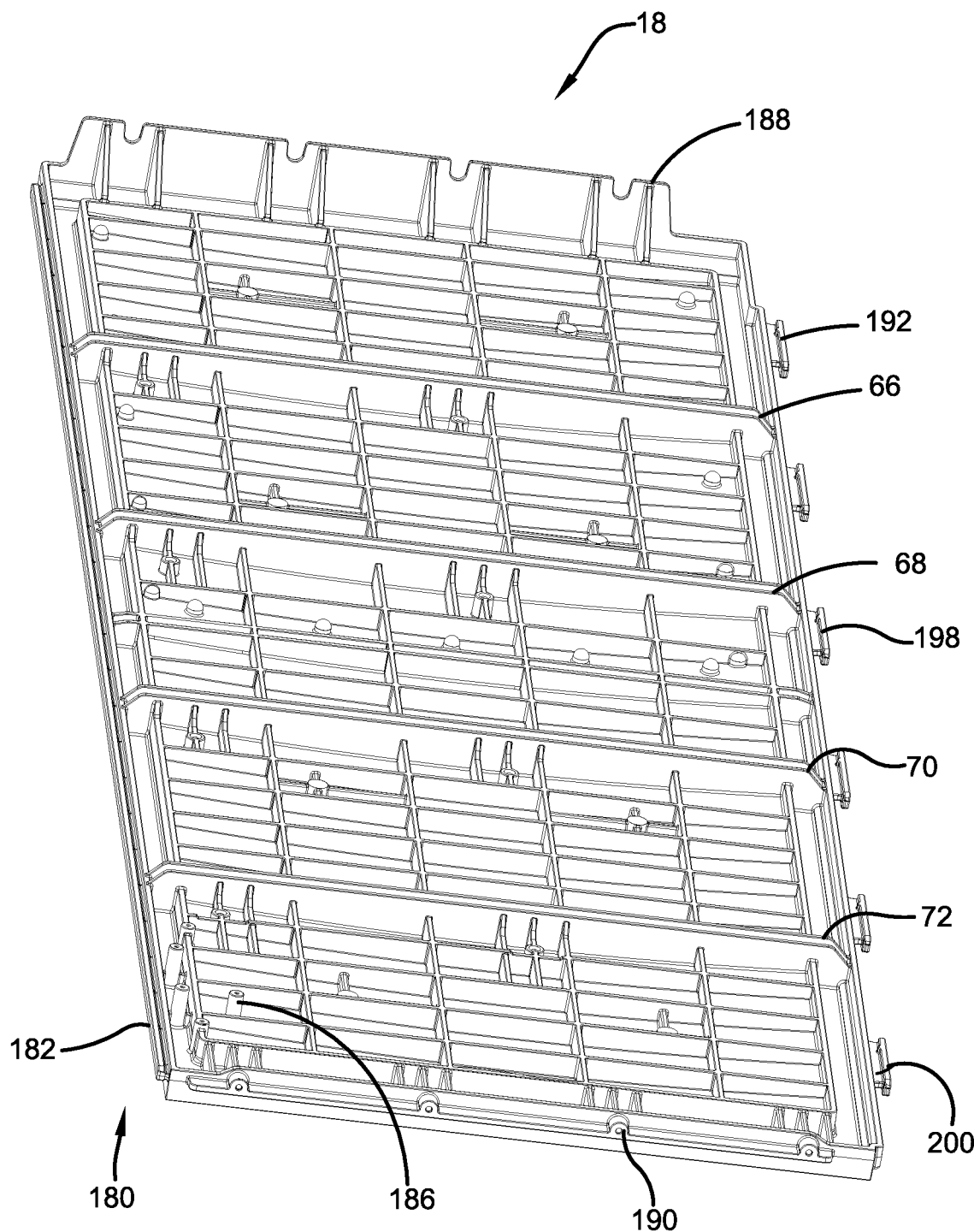
FIG. 25 is a perspective view showing the interior side of the left side exterior wall.

As shown in FIG. 25 the exemplary left side wall 18 includes mounting apertures 186 on the interior thereof below slot 72. As previously mentioned, because the interior compartment associated with door 37 extends transversely across the entire interior area of the repository, a lock associated with door 37 is mounted through the mounting apertures 186 to the inside face of left side wall 18. Further the inside face of the wall includes fastener accepting projections 188. Such fastener accepting projections 188 receive fasteners that connect the left side wall 18 and the top portion 24. As shown in FIG. 21 for example, right side wall 16 includes similar projections which are used for holding the top portion in attached connection with the right side wall. Further, the exemplary left side wall 18 includes lower fastener accepting projections 190. Projections 190 are utilized to accept fasteners that connect the left side wall to the bottom portion 22. As shown in FIG. 21 the right side wall 16 further includes similar fastener accepting projections that are utilized with fasteners to hold the right side wall 16 to the bottom portion 22.

Figure 26:
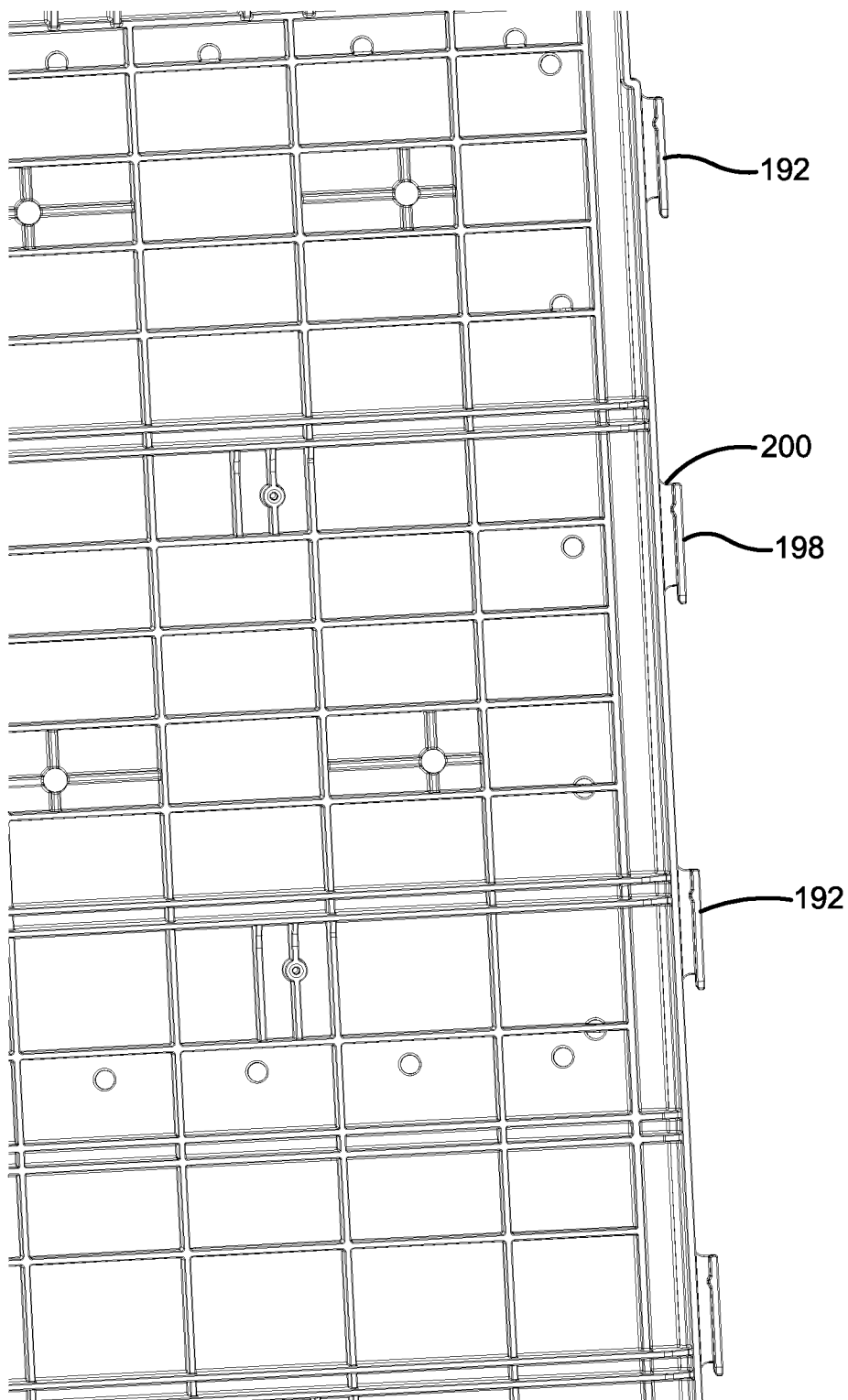
FIG. 26 shows an enlarged view of the rear portion of the left side interior wall.

Left side wall 18 further includes at the rear side thereof, a plurality of disposed hook projections 192. The configuration of hook projections 192 is best shown in FIG. 26. Right side wall 16 further includes hook projections 194 at a rear side thereof that have a similar configuration to hook projections 192. Each of the hook projections 192, 194 include in transverse cross-section a transversely enlarged rear head portion 198. Each rear head portion 198 is connected to the rear wall end through a transversely narrower rear neck portion 200.

Figure 27:
FIG. 27 shows an exemplary back wall of the repository.

As shown in FIGS. 27 and 28 the exemplary back wall 20 of the repository includes at each lateral side a plurality of hook projection engaging slots 202. The exemplary hook projection engaging slots are configured to enable slidable vertical engagement of respective hook portions 192, 194 therein. Once in engagement, the configuration of the hook engaging slots and the enlarged rear head portions 198 of the hook projections prevents the disengagement of the hook projections and the back wall 20 by relative movement forward and backward. This results because the enlarged rear head portions 198 of the hook projections hold the back wall in engaged relation with the hook projections absent sufficient vertical movement of the back wall to disengage therefrom.

In the exemplary arrangement because the back wall is operatively engaged through fasteners with the top portion 24, the bottom portion 22 and the interior shelves and dividers, relative movement of the side walls vertically relative to the back wall is prevented. Thus the exemplary arrangement provides that once the back wall has been engaged with the sidewalls through the engagement of the hook projections 192, 194 in the hook engaging slots 202, and the back wall has been secured to the other adjacent structures of the repository, the back wall is held in secure engagement which maintains the integrity of the repository body. Of course it should be understood that this arrangement is exemplary and in other arrangements other approaches may be used.

Figure 29:
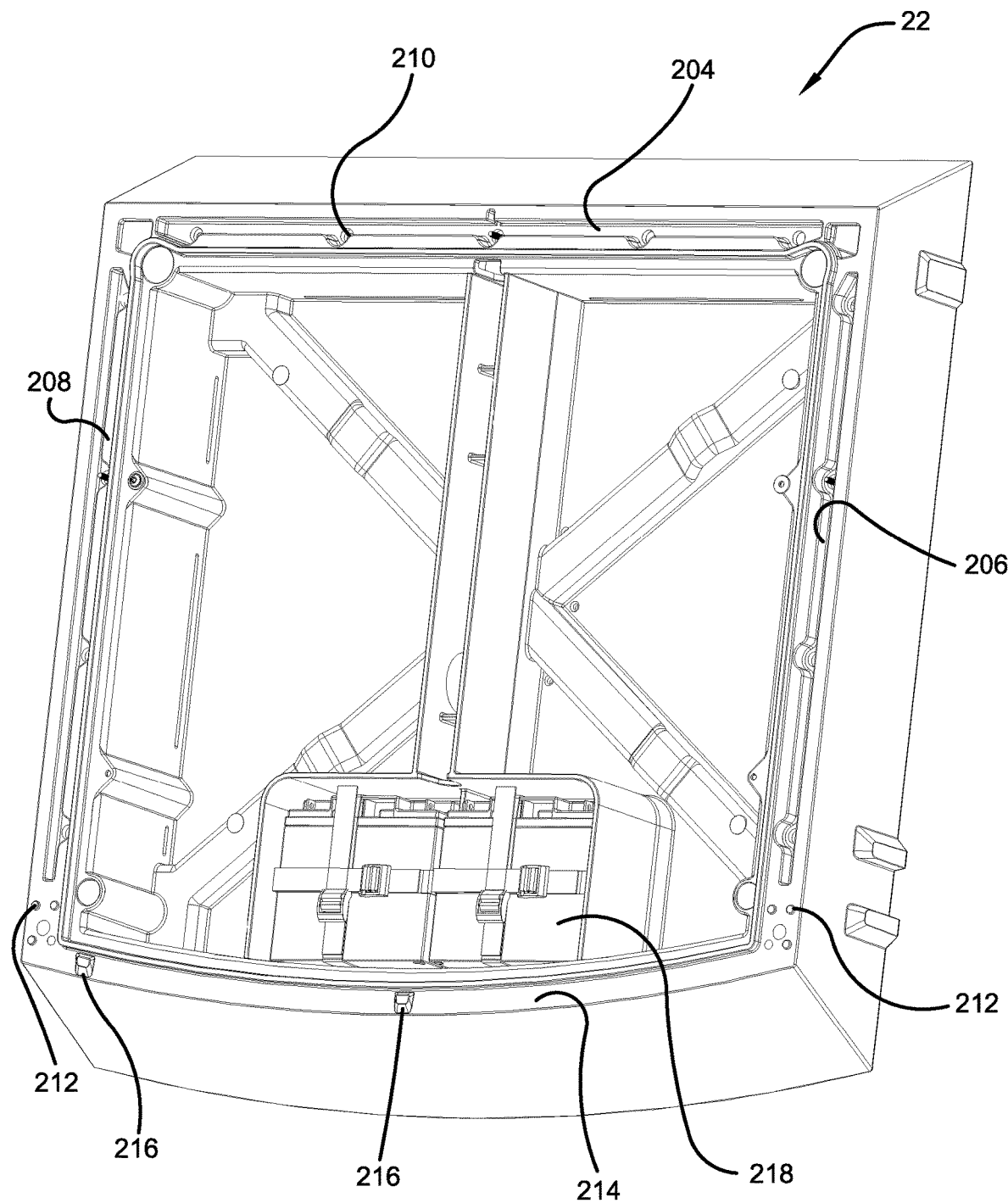
FIG. 29 is a perspective view showing the upper side of an exemplary repository bottom portion.
Figure 30:
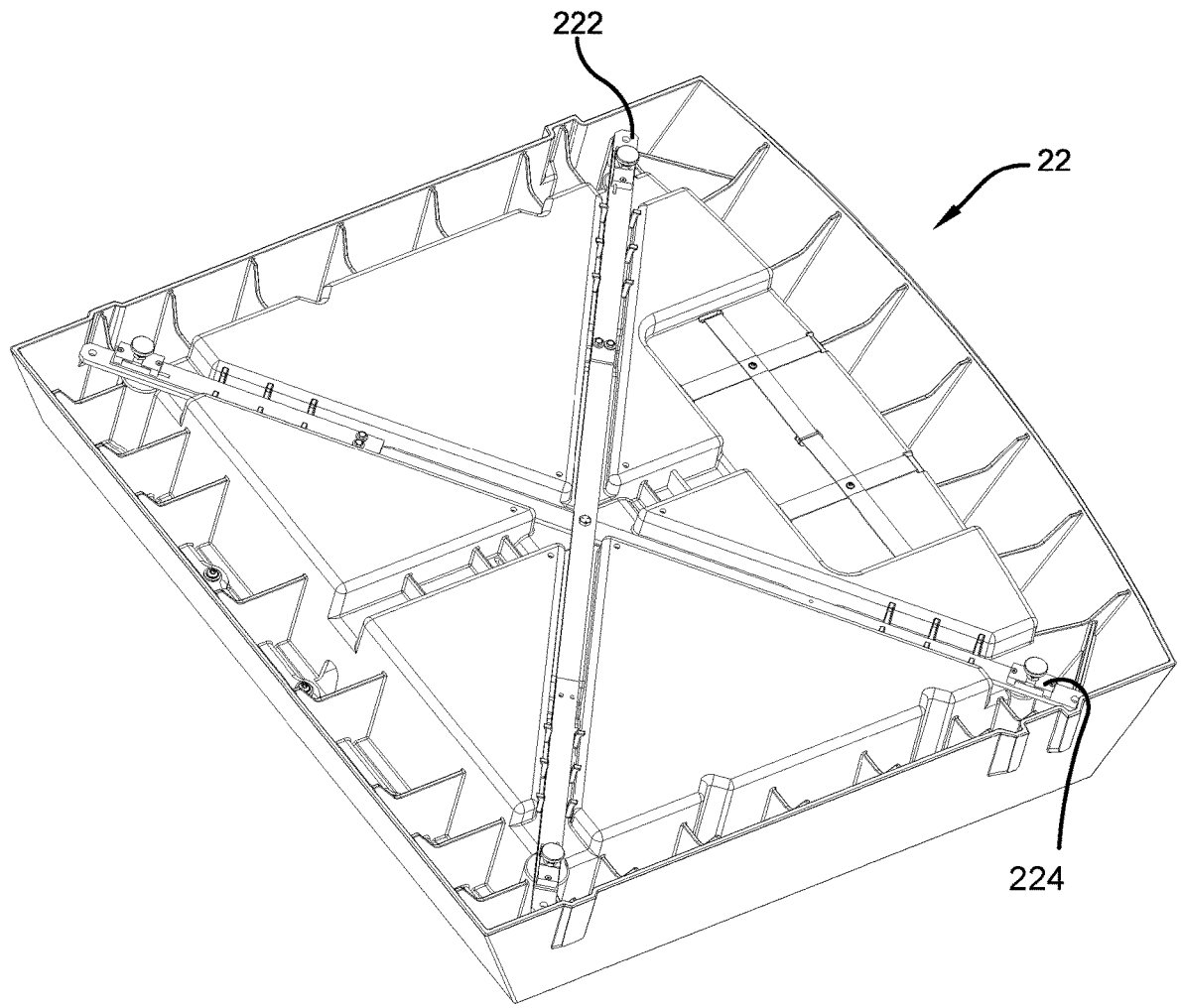
FIG. 30 is a perspective view showing the lower side of the exemplary bottom portion.

FIGS. 29 and 30 show the top and bottom respectively of the exemplary bottom portion 22. In the exemplary arrangement the bottom portion 22 is comprised of a molded thermoplastic. The bottom portion 22 includes an elongated recess 204 for accepting the lower end of the back wall 20 therein. A further recess 206 is configured to receive the lower end of the right side wall 16, and a recess 208 is configured to receive the lower end of the left side wall 18. A plurality of fastener accepting openings 210 accept fasteners that extend therethrough and hold the bottom portion 22 and the back wall and side walls in fixed engagement. A plurality of spaced upward extending projections 212 extend on each lateral side of the bottom portion 22. Projections 212 are configured to extend in the recesses at the bottom ends of channels 108 and 110 so as to hold the channels in the proper positions relative to the bottom portion 22. Of course this approach to holding the channels in fixed positions relative to the bottom portion is exemplary and in other arrangements other approaches may be used.

Further in the exemplary arrangement the bottom portion includes surface 214 that functions as a frame piece and which includes a plurality of tapered ramp surfaces 216 which are similar to tapered ramp surfaces 112 previously discussed. Tapered ramp surfaces 216 are operative to engage and axially move door 37 as the door is moved from the open position to the closed position.

The exemplary bottom portion 22 further includes at least one internal cavity 218. In the exemplary arrangement the at least one internal cavity 218 is utilized for holding electrical components. Such electrical components may include one or more batteries which provide power for the locks, control circuitry, sensing devices, reading devices, wireless communication devices and other devices that are used in connection with repositories as discussed in the incorporated disclosures. Further as shown in FIG. 4 some exemplary repositories may include a power source such as a solar panel 220. Such a solar panel may be mounted in operative supported connection with the top portion 24 or other structure of the repository so as to provide a power source for the electrical components of the repository. Of course in other exemplary arrangements the repository may be powered through suitable electrical connections to household current or other source of electrical power. Also in some exemplary arrangements one or more of the cavities may be utilized for purposes of housing control circuitry, wireless communication devices, sensing devices or other electrical devices utilized in connection with operation of the repository.

In the exemplary arrangement the underside of the bottom portion 22 as shown in FIG. 30 may include a plurality of disposed repository support feet 222. The exemplary support feet may be in operative connection with sensors such as force sensing load cells 224. The exemplary load cells may be in operative connection with control circuitry associated with the repository in a manner like that discussed in the incorporated disclosures. The exemplary force sensing load cells may be operative to determine changes in the weight of the repository which can be utilized for purposes of detecting the addition of parcels to the interior area of the repository and/or the removal of parcels from the interior area of the repository. This may be done in a manner like that discussed in the incorporated disclosures.

In the exemplary repository, the top portion 22 which bounds the upper end of the repository interior area, may include features like those discussed as included in the bottom portion for purposes of securing the side walls and the back wall in engaged relation therewith. Further the exemplary top portion may include lights for illuminating the front area of the repository. Further in exemplary arrangements the top portion may include cameras or other sensors, wireless communication devices which serve as input devices and/or output devices, sensors and circuitry such as those discussed in the incorporated disclosures.

The interior area of the repository may also include load sensors, proximity sensors, weight sensors, optical sensors, image capture devices, reading devices and other types of sensors discussed in the incorporated disclosures, which are usable in conjunction with the control circuitry associated with the repository for purposes of detecting the placement and/or removal of parcels from the interior areas of the repository. Such sensors may also be utilized in a manner like that discussed in the incorporated disclosures for determining the available capacity of the interior area of the repository and/or selected compartments within the repository. Further in exemplary arrangements reading devices, wireless communication devices, sensing devices, illumination devices, cameras or other image capture devices, wireless communication devices, or other input and/or output devices like those discussed in the incorporated disclosures, may be included on the repository. Such components and devices may be included within the top portion, bottom portion or other interior areas of the repository. Numerous different operational, functional and monitoring capabilities may be provided in conjunction with the exemplary repository features that have been described herein.

Thus the exemplary embodiments described herein achieve improved operation, eliminate difficulties encountered in the use of prior devices and systems, and attain the useful results described.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships that have been shown and described.

It should be understood that the features and/or relationships associated with one exemplary arrangement that has been described herein, can be combined with features and/or relationships from one or more other exemplary arrangements. That is, various features and/or relationships from various arrangements can be combined in further arrangements. The inventive scope of the disclosure is not limited to only the specific arrangements that have been shown or described herein.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:
    a repository that operates to accept and make available parcels to authorized users, including
        a body, wherein the body bounds an interior area configured for storage of parcels,
            wherein the body includes an opening to the interior area,
        a door,
            wherein the door is movably mounted in operative connection with the body,
            wherein the door while in operatively attached connection with the body is rotationally movable about an axis and axially movable along the axis,
            wherein the door is movable between
                a closed position, wherein in the closed position the door closes the opening, and
                an open position, wherein in the open position the interior area is accessible from outside the body,
        a lock, wherein the lock is in operative connection with the door,
            wherein the lock is selectively changeable between
                a locked condition, wherein in the locked condition the lock is operative to hold the door in the closed position, and
                an unlocked condition wherein in the unlocked condition the door is movable from the closed position to the open position,
        wherein the repository is in operative connection with
            at least one externally accessible input device, wherein the at least one input device is operatively accessible with the door in the closed position,
            at least one reading device, wherein the at least one reading device is configured to read parcel indicia associated with a parcel configured to be placed in the interior area, wherein the parcel indicia uniquely identifies the parcel, and
            control circuitry, wherein the control circuitry is in operative connection with
                the lock,
                the at least one input device, and
                the at least one reading device wherein the control circuitry is operative to cause
user identifying information and data corresponding to read parcel indicia to be enabled to be received by the control circuitry through the at least one input device,
a user authorization determination to be made that the received user identifying information corresponds to an authorized user that is authorized to access the interior area,
responsive at least in part to the data corresponding to the read parcel indicia,
a parcel determination to be made that the read parcel indicia corresponds to stored data for a parcel that is authorized prior to receipt of the user identifying information, to be placed in the interior area of the repository,
responsive at least in part to at least one of the user authorization determination and the parcel determination, the lock to be changeable from the locked condition to the unlocked condition, whereby the parcel is enabled to be placed in the interior area.

2. The apparatus according to claim 1
and further comprising a hinge, wherein the door is movably mounted in operative connection with the body through the hinge,
wherein the hinge includes a first hinge leaf and a second hinge leaf, wherein the first hinge leaf and the second hinge leaf are relatively rotatable to one another about the axis,
wherein at least one of the first hinge leaf and the second hinge leaf is axially movable relative to the body.

3. The apparatus according to claim 2
wherein one of the door or the body includes an axially extending track in fixed operative connection therewith,
wherein one of the first hinge leaf and the second hinge leaf includes at least one projection in fixed operative connection with the one hinge leaf,
wherein the at least one projection extends in and is axially movable in engaged relation with the track.

4. The apparatus according to claim 3
wherein in transverse cross-section the track includes
a planar outer track face surface,
a recess disposed inwardly in the track away from the outer track face surface,
a slot, wherein the slot extends perpendicular to the outer track face surface and between the outer track face surface and the recess,
wherein the recess is wider than the slot in a direction parallel to the outer track face surface,
and further including
a mounting strip, wherein in transverse cross-section the mounting strip includes
the at least one projection, wherein the at least one projection extends in the slot,
a base, wherein the base is in attached connection with the at least one projection,
wherein the base
extends in the recess,
is wider than the at least one projection in the parallel direction, whereby the base is prevented from being moved outwardly through the slot,
is axially movable within the track,
wherein the one hinge leaf is axially movable in fixed engaged relation with the mounting strip.

5. The apparatus according to claim 4
wherein the mounting strip
is axially elongated,
includes a pair of axially aligned projections, wherein the projections of the pair are axially spaced from one another,
wherein the base includes a fastener accepting base opening,
wherein the fastener accepting base opening extends through the base and parallel to the slot, and
is axially intermediate of the projections of the pair,
wherein the one hinge leaf of the hinge includes a fastener accepting leaf opening,
a fastener, wherein the fastener extends in the fastener accepting leaf opening, the slot and the fastener accepting base opening,
wherein when the fastener extends in the fastener accepting base opening the fastener is axially movable within the slot.

6. The apparatus according to claim 5
wherein the mounting strip includes
a plurality of axially disposed pairs of projections,
a plurality of fastener accepting base openings,
wherein each respective fastener accepting base opening extends axially intermediate of the projections of each respective pair,
wherein the one hinge leaf includes a plurality of fastener accepting leaf openings,
and further including
a plurality of fasteners,
wherein each respective fastener extends in a respective fastener accepting leaf opening, the slot and a respective fastener accepting base opening.

7. The apparatus according to claim 6
wherein the opening to the interior area of the body is bounded by at least one frame piece,
wherein the at least one frame piece includes at least one tapered ramp surface,
wherein the at least one tapered ramp surface is configured to operatively engage and axially move the door as the door is moved from the open position to the closed position.

8. The apparatus according to claim 6
wherein the track is in fixed operative connection with the body,
wherein the one hinge leaf is engaged with the mounting strip through the plurality of fasteners, and wherein the other hinge leaf is in fixed operative connection with the door,
wherein each leaf of the hinge includes at least one respective knuckle portion, wherein the axis extends through the knuckle portions,
wherein in transverse cross section the planar outer track face surface includes an axially extending recess,
wherein the knuckle portions are axially movable in the recess.

9. The apparatus according to claim 6
wherein the body of the repository includes
a plurality of interior areas, each of which interior areas has a respective body opening,
and further including
a plurality of doors, wherein each respective door is axially and rotationally movably mounted in operative connection with the body through the track,
wherein each door is rotationally movable about the axis and axially movable along the axis, wherein each respective door is movable to selectively close and make accessible from outside the body, a respective interior area.

10. The apparatus according to claim 6
wherein the body includes a wall,
wherein the wall includes a wall end,
wherein the track is in fixed operative connection with the wall end.

11. The apparatus according to claim 10
and further including a channel,
wherein the channel includes the track,
wherein the wall end and the channel each include at least one respective interengaging projection and recess,
wherein the channel and the wall are held in engaged relation through engagement of the at least one interengaging projection and recess.

12. The apparatus according to claim 10
wherein the wall end includes in transverse cross-section
a head portion, wherein the wall terminates in the head portion, and
a neck portion, wherein the neck portion is disposed away from the head portion and is smaller in transverse thickness than the head portion,
wherein the channel includes in transverse cross-section
a wall engaging face,
a wall slot, wherein the wall slot extends perpendicular to the wall engaging face,
a wall recess, wherein the wall recess is
disposed inwardly in the channel from the wall engaging face, and
is wider in a direction parallel to the wall engaging face than the wall slot,
wherein the head portion extends in the wall recess and the neck portion extends in the slot,
whereby the wall is held in attached engagement with the channel.

13. The apparatus according to claim 12
wherein in transverse cross section the wall engaging face and the planar outer track face surface extend on the channel in parallel relation.

14. The apparatus according to claim 13
wherein in an operative position of the repository, the axis extends vertically.

15. The apparatus according to claim 14
wherein the body further includes
a further wall, wherein the further wall extends parallel to the wall and is transversely disposed therefrom,
wherein the further wall bounds the interior area,
wherein the further wall includes a further wall end,
a further channel, wherein the further channel is in fixed operatively engaged connection with the further wall end.

16. The apparatus according to claim 15
wherein the lock is in operatively fixed connection with the further wall.

17. The apparatus according to claim 15
and further including
a further door,
wherein the further door is movably mounted in operative connection with the further channel,
wherein the further door while in operatively attached connection with the further channel is
rotationally movable about a further axis, wherein the further axis extends parallel to the axis, and
axially movable along the further axis.

18. The apparatus according to claim 1
wherein the body is in fixed operative connection with an axially extending track,
wherein the door is axially movable while held in operatively engaged relation with the track.

19. The apparatus according to claim 1
wherein the opening to the interior area of the body is bounded by at least one frame piece,
wherein the at least one frame piece includes at least one tapered ramp surface,
wherein the at least one tapered ramp surface is configured to operatively engage and axially move the door as the door is moved from the open position to the closed position.

20. The apparatus according to claim 1
wherein the body is in fixed operative connection with an axially extending track,
wherein the body of the repository further includes
a plurality of interior areas, wherein each of which interior areas has a respective opening,
and further including
a plurality of doors, wherein each respective door is axially and rotationally movably mounted in operative connection with the body through the track,
wherein each door is rotationally movable about the axis and axially movable along the axis.

21. The apparatus according to claim 1
wherein the body further includes
a wall, wherein the wall includes a wall end, and
an axially extending track, wherein the axially extending track is in fixed operative connection with the wall end,
wherein the door is rotationally and axially movably mounted in operative connection with the body through the track.

22. The apparatus according to claim 1
wherein the body further includes
a wall, wherein the wall includes a wall end,
a channel, wherein the channel extends along the axis,
wherein in transverse cross-section the channel includes
a wall face, wherein the wall face includes a wall slot,
wherein the wall is engaged with the channel via wall end engagement in the wall slot,
a track, wherein the track is disposed on the channel from the wall slot,
wherein the door is axially movable in operatively engaged relation with the track.

23. Apparatus comprising:
a repository that operates to accept and make available parcels to authorized users, including
a body, wherein the body bounds an interior area configured for storage of parcels,
wherein the body includes an opening to the interior area,
a door,
wherein the door is movably mounted in operative connection with the body,
wherein the door while in operatively attached connection with the body is rotationally movable about an axis and axially movable along the axis,
wherein the door is movable between
a closed position, wherein in the closed position the door closes the opening, and
an open position, wherein in the open position the interior area is accessible from outside the body, a lock, wherein the lock is in operative connection with the door,
   wherein the lock is selectively changeable between
      a locked condition, wherein in the locked condition the lock is operative to hold the door in the closed position, and
      an unlocked condition, wherein in the unlocked condition the door is movable from the closed position to the open position,
wherein the repository is in operative connection with
   at least one wireless input device, wherein the at least one wireless input device is operatively accessible with the door in the closed position,
   control circuitry, wherein the control circuitry is in operative connection with
      the lock, and
      the at least one wireless input device,
wherein the control circuitry is operative to cause
   the at least one wireless input device to be enabled to receive at least one of
      user identifying information, wherein the user identifying information corresponds to a user that requests access to the interior area,
      parcel identifying information, wherein the parcel identifying information corresponds to parcel indicia that is associated with a parcel,
   at least one of a user authorization determination that the user identifying information corresponds to an authorized user that is authorized to access the interior area, and a parcel determination that the parcel identifying information corresponds to stored data for a parcel that is authorized to be placed in the interior area,
   responsive at least in part to the at least one of the user authorization determination and the parcel determination, the lock in the locked condition to be changeable to the unlocked condition, whereby the interior area is accessible from outside the body of the repository.

24. The apparatus according to claim 23
wherein the control circuitry is operative to cause the lock in the locked condition to be changeable to the unlocked condition responsive at least in part to the user authorization determination and the parcel determination, and
wherein the parcel determination includes determining that the parcel indicia corresponds to stored data for a parcel that is authorized to be placed in the interior area of the repository prior to receipt of the user identifying information.

\* \* \* \* \*